(12) United States Patent
Matsuoka et al.

(10) Patent No.: US 9,691,257 B2
(45) Date of Patent: *Jun. 27, 2017

(54) SYSTEMS AND METHODS FOR SILENCING AN AUDIBLE ALARM OF A HAZARD DETECTION SYSTEM

(71) Applicant: Google Inc., Mountain View, CA (US)

(72) Inventors: Yoky Matsuoka, Palo Alto, CA (US); AJ Minich, San Mateo, CA (US); Yash Modi, Foster City, CA (US); Andrew W. Goldenson, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/334,261

(22) Filed: Jul. 17, 2014

(65) Prior Publication Data

US 2015/0022344 A1    Jan. 22, 2015

Related U.S. Application Data

(60) Provisional application No. 61/847,960, filed on Jul. 18, 2013, provisional application No. 61/889,013, filed on Oct. 9, 2013.

(51) Int. Cl.
| | | |
|---|---|---|
| *G08B 23/00* | (2006.01) | |
| *G08B 25/00* | (2006.01) | |
| *G06F 3/01* | (2006.01) | |
| *G08B 17/10* | (2006.01) | |
| *G08B 25/10* | (2006.01) | |
| *G08B 17/113* | (2006.01) | |

(52) U.S. Cl.
CPC ........... *G08B 25/008* (2013.01); *G06F 3/017* (2013.01); *G08B 17/10* (2013.01); *G08B 25/001* (2013.01); *G08B 25/10* (2013.01); *G08B 17/113* (2013.01)

(58) Field of Classification Search
CPC .... G08B 25/008; G08B 17/10; G08B 25/001; G08B 25/10; G08B 17/113; G06F 3/017
USPC .................. 340/514, 506, 511, 517, 3.1
See application file for complete search history.

(56) References Cited

U.S. PATENT DOCUMENTS

| | | | |
|---|---|---|---|
| 4,356,868 A | 11/1982 | Bentley et al. | |
| 4,435,700 A | 3/1984 | Alley | |
| 5,400,246 A | 3/1995 | Wilson et al. | |
| 5,473,368 A | 12/1995 | Hart | |

(Continued)

*Primary Examiner* — Daryl Pope
(74) *Attorney, Agent, or Firm* — Van Court & Aldridge LLP

(57) ABSTRACT

Hazard detection systems and methods according to embodiments described herein are operative to enable a user to interface with the hazard detection system by performing a touchless gesture. The touchless gesture can be performed in a vicinity of the hazard detection system without requiring physical access to the hazard detection system. This enables the user to interact with the hazard detection system even if it is out of reach. The hazard detection system can detect gestures and perform an appropriate action responsive to the detected gesture. In one embodiment, the hazard detection system can silence its audible alarm or preemptively turn off its audible alarm in response to a detected gesture. Gestures can be detected using one or more ultrasonic sensors, or gestures can be detected using a motion detector in combination with one or more ultrasonic sensors.

26 Claims, 24 Drawing Sheets

(56) References Cited

U.S. PATENT DOCUMENTS

| | | | |
|---|---|---|---|
| 5,476,004 | A | 12/1995 | Kingsford |
| 5,959,529 | A * | 9/1999 | Kail, IV ............... G01S 19/17 128/903 |
| 6,239,736 | B1 | 5/2001 | McDonald et al. |
| 7,109,879 | B2 | 9/2006 | Stults et al. |
| 7,690,569 | B2 * | 4/2010 | Swanson ............... H04Q 9/00 235/440 |
| 8,754,775 | B2 | 6/2014 | Holcombe |
| 8,847,772 | B2 | 9/2014 | Marks et al. |
| 9,265,001 | B1 | 2/2016 | Tannenbaum et al. |
| 2008/0291036 | A1 | 11/2008 | Richmond |
| 2010/0238036 | A1 | 9/2010 | Holcombe |
| 2011/0279273 | A1 | 11/2011 | Warren |
| 2012/0081229 | A1 | 4/2012 | Daniel |
| 2013/0314225 | A1 | 11/2013 | Baker |
| 2015/0022316 | A1 | 1/2015 | Dixon et al. |

* cited by examiner

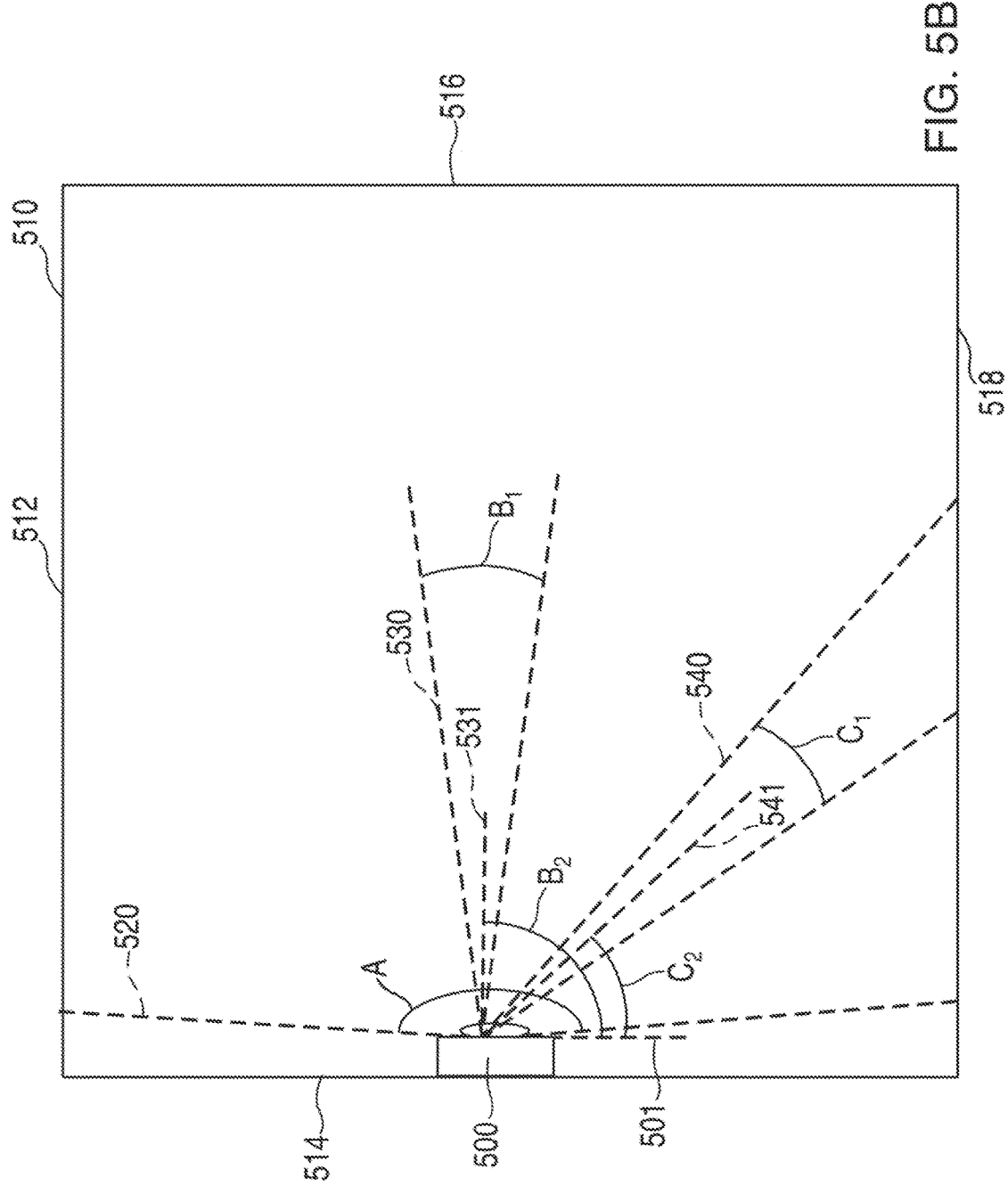

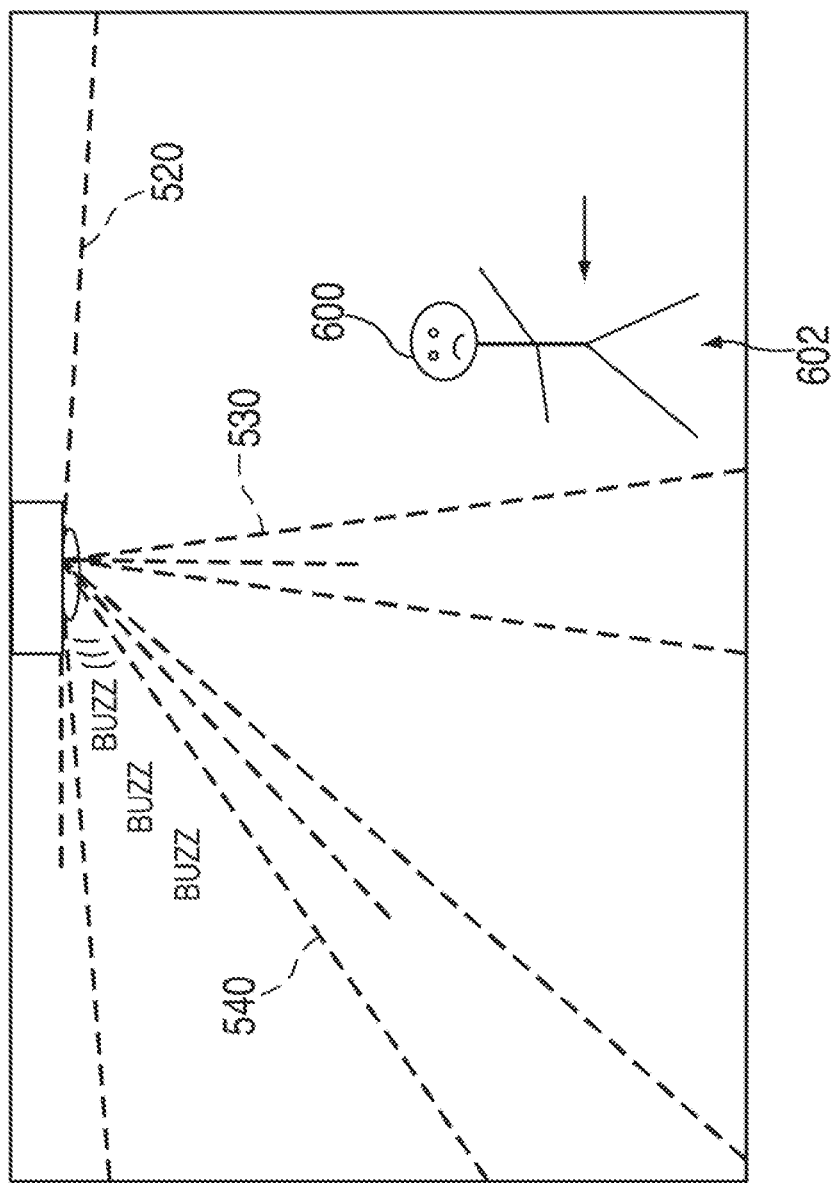

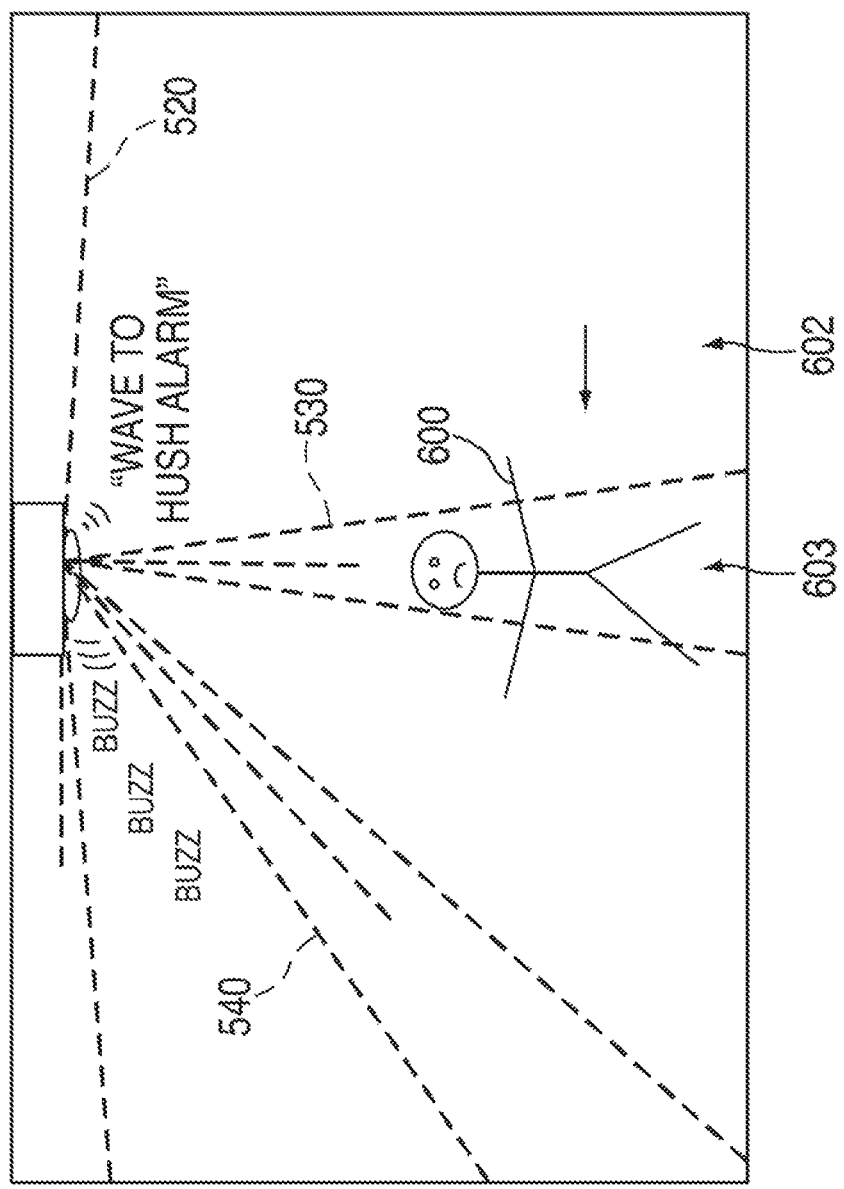

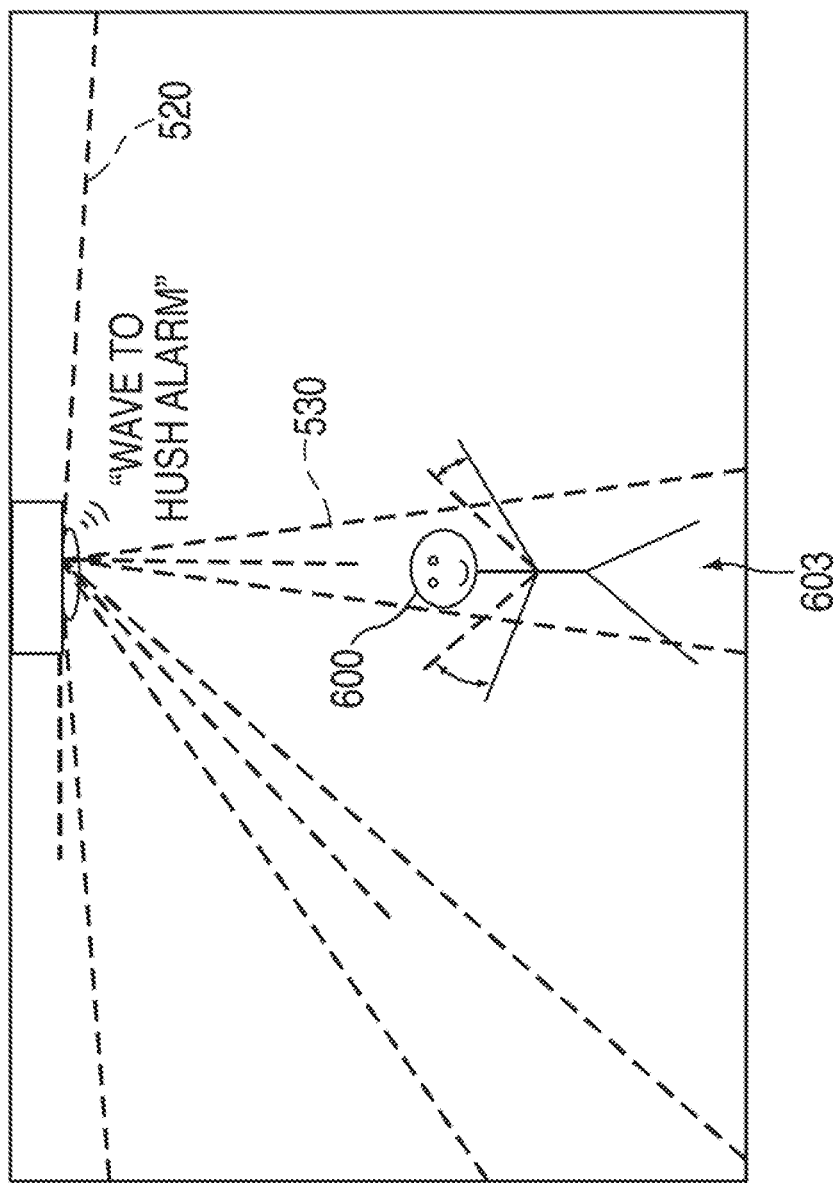

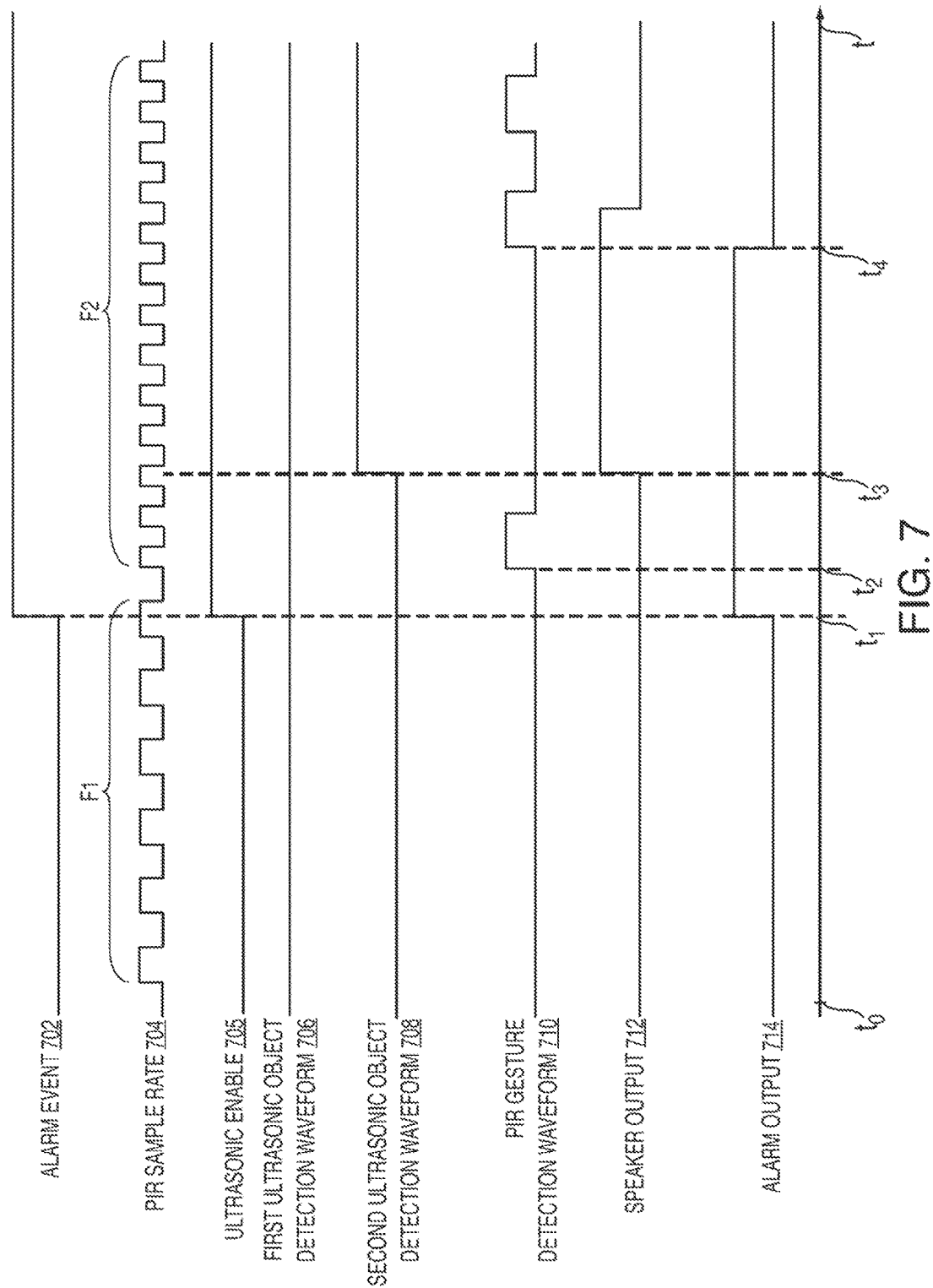

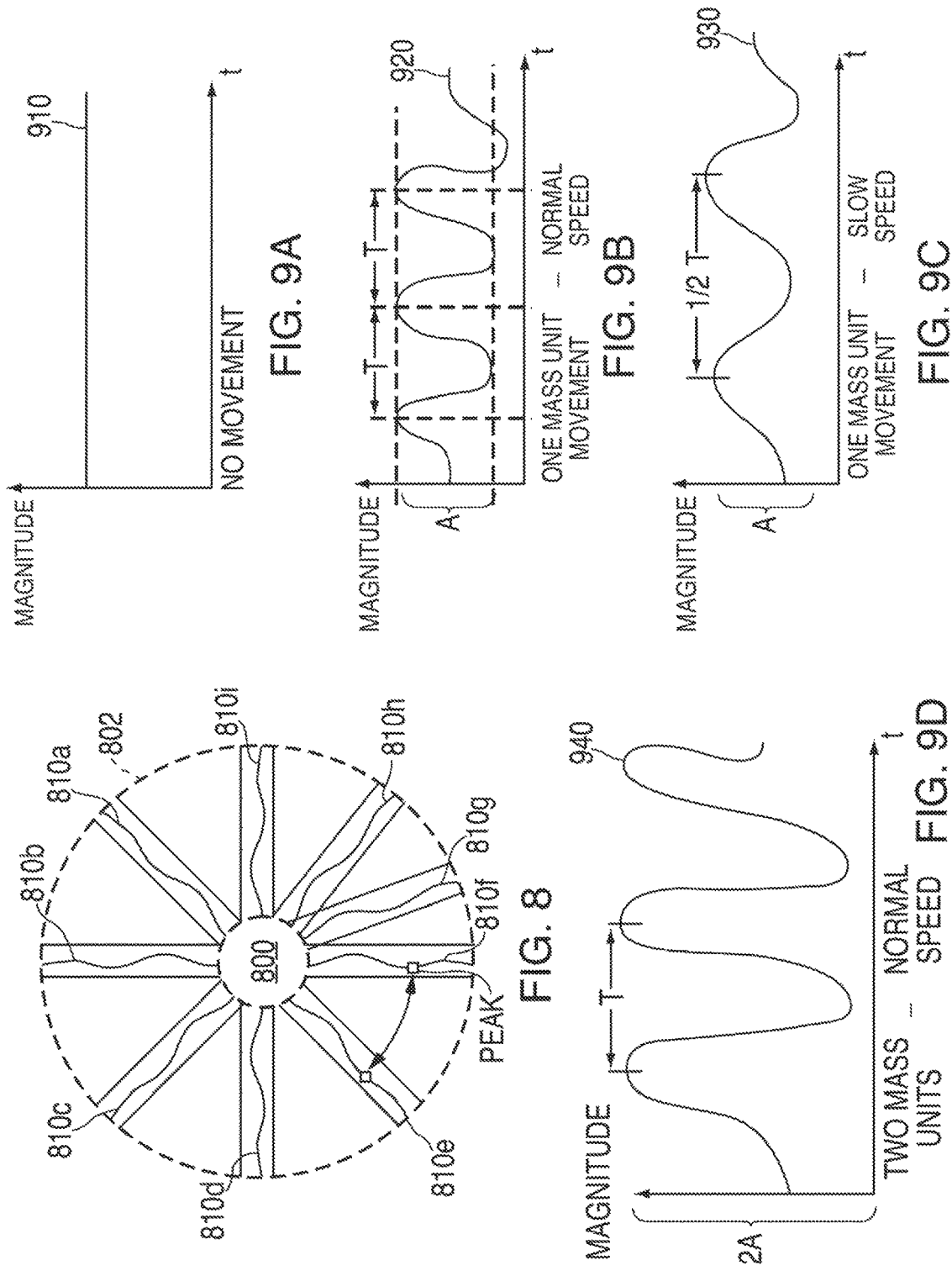

SYSTEMS AND METHODS FOR SILENCING AN AUDIBLE ALARM OF A HAZARD DETECTION SYSTEM

CROSS-REFERENCE TO RELATED APPLICATIONS

This patent application claims priority to each of U.S. Provisional Patent Application Nos. 61/847,960, filed Jul. 18, 2013, and 61/889,013, filed Oct. 9, 2013. Each of the above-referenced patent applications is incorporated by reference in its entirety for all purposes.

TECHNICAL FIELD

This patent specification relates to systems and methods for interfacing with a hazard detection system. More particularly, this patent specification relates to systems and methods for detecting gestures performed in proximity of the hazard detection system.

BACKGROUND

Hazard detection systems such as smoke detectors, carbon monoxide detectors, combination smoke and carbon monoxide detectors, as well as systems for detecting other dangerous conditions have been used in residential, commercial, and industrial settings for safety considerations. When these systems detect the presence of a dangerous condition, they often sound an audible alarm. The alarm is often characterized as having an extremely loud or ear piercing sound, and can be unpleasant or very uncomfortable to a human listener. Some hazard detectors may permit a user to press a button located on the cover of the unit, sometimes termed a hush button or temporary silence button, when they know an alarm to be caused by a non-emergency situation, such as smoke from cooking. When the hush button or temporary silence button is pressed, the audible alarm noise is temporarily silenced for a predetermined interval of time, such as in the range of four to ten minutes, during which the user has an opportunity to address the situation, such as by opening a window, without being required to endure the ear-piercing sound of the alarm. If the condition persists at the end of the predetermined interval of time, then the audible alarm noise resumes. One issue that can arise in many practical situations is that the hazard detector unit is mounted high on a wall or on a ceiling that is out of the reach of the user, leading many users to seek out a ladder, chair, or broomstick in order to press the hush button or temporary silence button, which can lead to inconvenient, impractical, and/or unsafe scenarios. Other issues arise as would be apparent to a person skilled in the art in view of the instant disclosure.

SUMMARY

Hazard detection systems and methods according to embodiments described herein are operative to enable a user to interface with the hazard detection system by performing a touchless gesture. The touchless gesture can be performed in a vicinity of the hazard detection system without requiring the user to physically touch the hazard detection system. This enables the user to interact with the hazard detection system even if it is out of reach. The hazard detection system can detect gestures and perform an appropriate action responsive to the detected gesture. In one embodiment, the hazard detection system can silence its audible alarm in response to a detected gesture. In another embodiment, the hazard detection system can preemptively turn off its audible alarm in response to a detected gesture. For example, a user may wish to preemptively prevent an audible alarm from sounding if she is performing an activity (e.g., cooking) that may result in an alarm event, but an alarm event that is not necessarily warranted.

Gestures can be detected using gesture detection circuitry and methods according to various embodiments. The gesture detection circuitry can use one more sensors to detect one or more objects that may be performing a gesture. In one embodiment, gestures can be detected using one or more ultrasonic sensors. In another embodiment, gestures can be detected using a motion detector in combination with one or more ultrasonic sensors.

In one embodiment, a hazard detection system can include at least one hazard detection sensor. One or more of the hazard detection sensors can be operative to detect smoke, heat, humidity, carbon monoxide, carbon dioxide, or radon. The system can include alarm generation circuitry that is operative to sound an audible alarm in response to a hazard event detected by the at least one hazard detection sensor. The system can include a passive infrared (PIR) sensor having a relatively wide field of view for detecting movement of at least one object, and at least one ultrasonic sensor each having a relatively narrow field of view for detecting presence of the at least one object. The narrow field of view is less than the wide field of view. The system can include control circuitry operative to process data acquired by the PIR sensor and the ultrasonic sensor, determine if a gesture hush event exists in the processed data, cease the sound of the audible alarm when the gesture hush event is determined to exist.

In another embodiment, a hazard detection system can include at least one hazard detection sensor, alarm generation circuitry operative to sound an audible alarm, a speaker for playing back a recorded message, and at least one object detection sensor for detecting a gesture event. The system can include control circuitry operative to playback a recorded message through the speaker. The recorded message can include instructions for a user to perform the gesture event in a vicinity of the hazard detection system. The control circuitry is further operative to process data acquired from the at least one object detection sensor to determine whether the gesture event has been performed, and change a state of the hazard detection system in response to a determination that the gesture event has been performed.

In another embodiment, a method for silencing a hazard alarm of a hazard detection system is provided. The method can include emitting an audible alarm in response to a detected hazard event, playing back a recording that provides instructions on how to at least temporarily silence the audible alarm, detecting an object moving in a vicinity of the hazard detection system in accordance with the instructions of the recording, and at least temporarily silencing the audible alarm in response to detecting the object moving in accordance with the instructions of the recording.

In another embodiment, a hazard detection system can include alarm generation circuitry for generating an audible alarm in response to a detected hazard event, and at least one ultrasonic sensor, each ultrasonic sensor having a detection field for monitoring presence of at least one object. The system can include control circuitry operative to instruct the alarm generation circuitry to emit the audible alarm during the detected hazard event, receive sensor data from at least one sensor, including the at least one ultrasonic sensor, process the sensor data to determine whether a hush gesture has been captured by the received sensor data, and instruct the alarm generation circuitry to at least temporarily cease emitting the audible alarm when the hush gesture has been captured by the received sensor data.

In another embodiment, a method for processing a gesture to alter a state of an audible alarm is provided. The method can include activating alarm generation circuitry to emit an audible alarm, monitoring at least one ultrasonic detection field for presence of at least one object, determining whether the at least one object is moving in accordance with a gesture while the at least one object is present in the at least one ultrasonic detection field, and deactivating the alarm generation circuitry to cease emitting the audible alarm when it is determined that the at least one object is moving in accordance with the gesture while the at least one object is present in the at least one ultrasonic detection field.

In another embodiment, a hazard detection system can include at least one hazard detection sensor operative to monitor an environment in a vicinity of the hazard detection system. The hazard detection system can operate according to one of an idle mode, a pre-alarm mode, and an alarm mode. The system can include alarm generation circuitry operative to sound an audible alarm in the alarm mode, a speaker operative to playback at least one recorded message, and gesture detection circuitry operative to monitor the vicinity for a gesture. The system can include control circuitry operative to select one of the idle, pre-alarm, and alarm modes based on data acquired from the at least one hazard detection sensor. When the hazard detection system is in the pre-alarm mode, the control circuitry is further operative to playback a recorded message through the speaker, detect whether the gesture is monitored by the gesture detection circuitry, and preemptively disable the alarm generation circuitry when the gesture is detected and the data acquired from the at least one hazard detection sensor is sufficient to change the system operation from the pre-alarm mode to the alarm mode.

In another embodiment, a gesture detection system can include a passive infrared (PIR) sensor operative to detect movement of at least one object, an ultrasonic sensor operative to detect presence of at least one object, and circuitry. The circuitry can be operative to use the ultrasonic sensor to create a static environmental model, use the ultrasonic sensor to produce a dynamic environmental model, and compare the dynamic model to the static model to determine whether at least one new object is present.

A further understanding of the nature and advantages of the embodiments discussed herein may be realized by reference to the remaining portions of the specification and the drawings.

BRIEF DESCRIPTION OF THE DRAWINGS

FIG. 5B shows illustrative detection fields emanating from interface sensors of hazard detection system mounted in a second position, according to some embodiments;

FIGS. 6A-6D show illustrative snapshots in time in which a person uses a gesture to silence an audible alarm, according to some embodiment;

FIG. 7 shows an illustrative timing diagram of various components of a hazard detection system, according to some embodiments;

FIG. 8 shows an illustrative detection field for a PIR sensor, according to some embodiments;

FIGS. 9A-9D show several different illustrative graphs showing PIR sensor data according to some embodiments;

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

Figure 1:
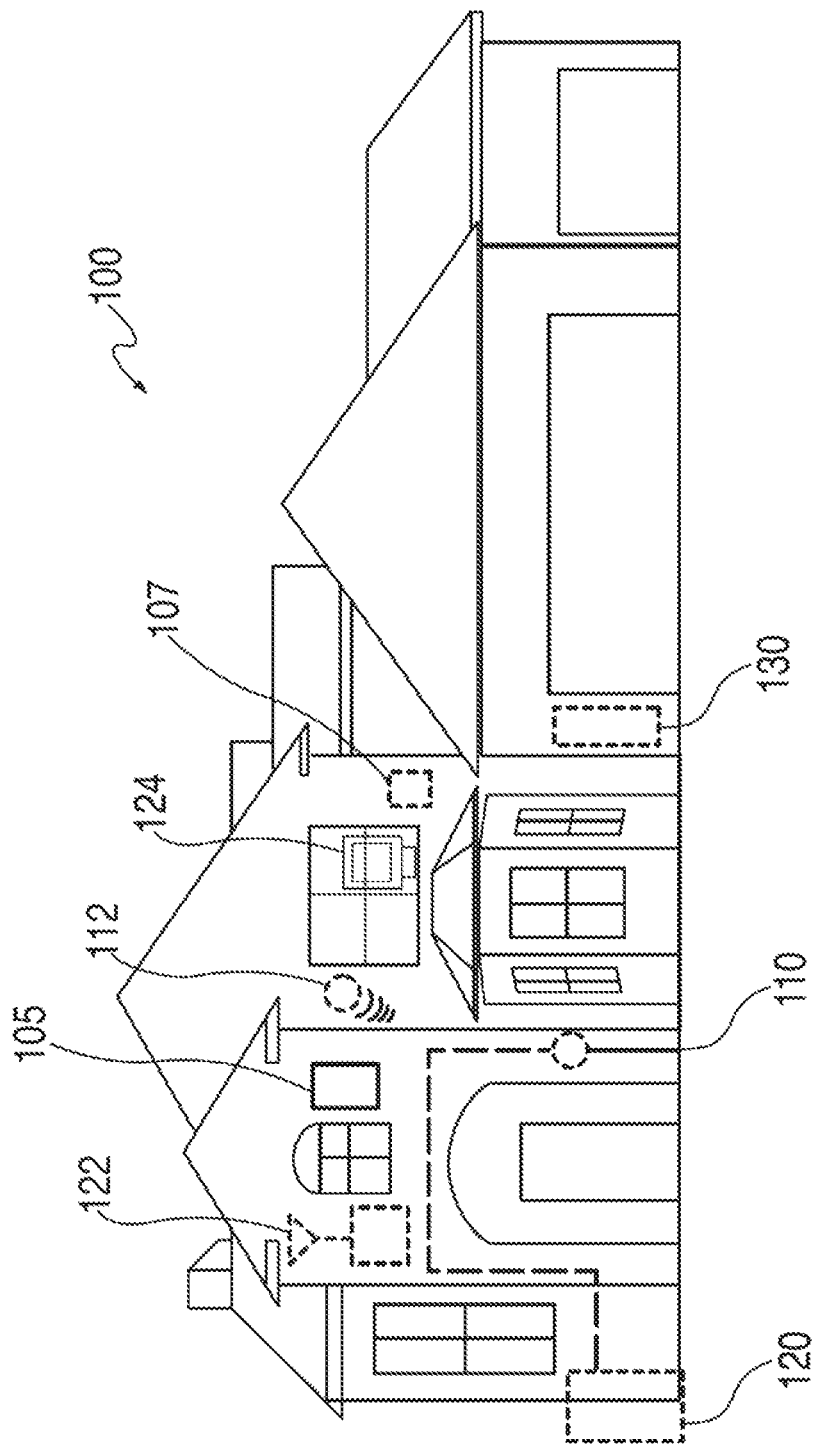
FIG. 1 is a diagram of an enclosure with a hazard detection system, according to some embodiments.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or be line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following power consuming components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, one or more temperature sensors, one or more ultrasonic sensors, a passive infra-red (PIR) sensor, a speaker, one or more LED's, and a buzzer. It is understood multiple instances of the same component may exist, whereas other components may only exist in one instance.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, carbon dioxide, radon, and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure, including the communication of software updates between hazard detection systems), visual safety indicators (e.g., display of a green light indicates it is safe and display of a red light indicates danger), tactile and non-tactile input command processing, and software updates.

It should be understood that hazard detection system 105 may be implemented as a smart home device. Thus, although the discussion of the hazard detection system is described primarily with reference to specific hazards (e.g. smoke, CO, heat), the hazard detection system may provide additional features and functionality unrelated to those hazards. For example, the hazard detection system may monitor many different conditions. These conditions can include motions, sounds, and smells. These conditions can also include data supplied by remote sensors (e.g., armbands, door sensors, window sensors, personal media devices).

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement enables hazard detection system 105 to manage the alarming and pre-alarming states in a manner that uses minimal power while simultaneously providing relatively failsafe hazard detection and alarming functionality. Additional details of multi-criteria state machines can be found, for example, in commonly assigned U.S. Pat. No. 9,412,258, the disclosure of which is incorporated by reference herein its entirety.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that controls HVAC system 120. Thermostat 110 can be referred to as the "primary" thermostat because it is electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link.

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link, or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network service. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Figure 2:
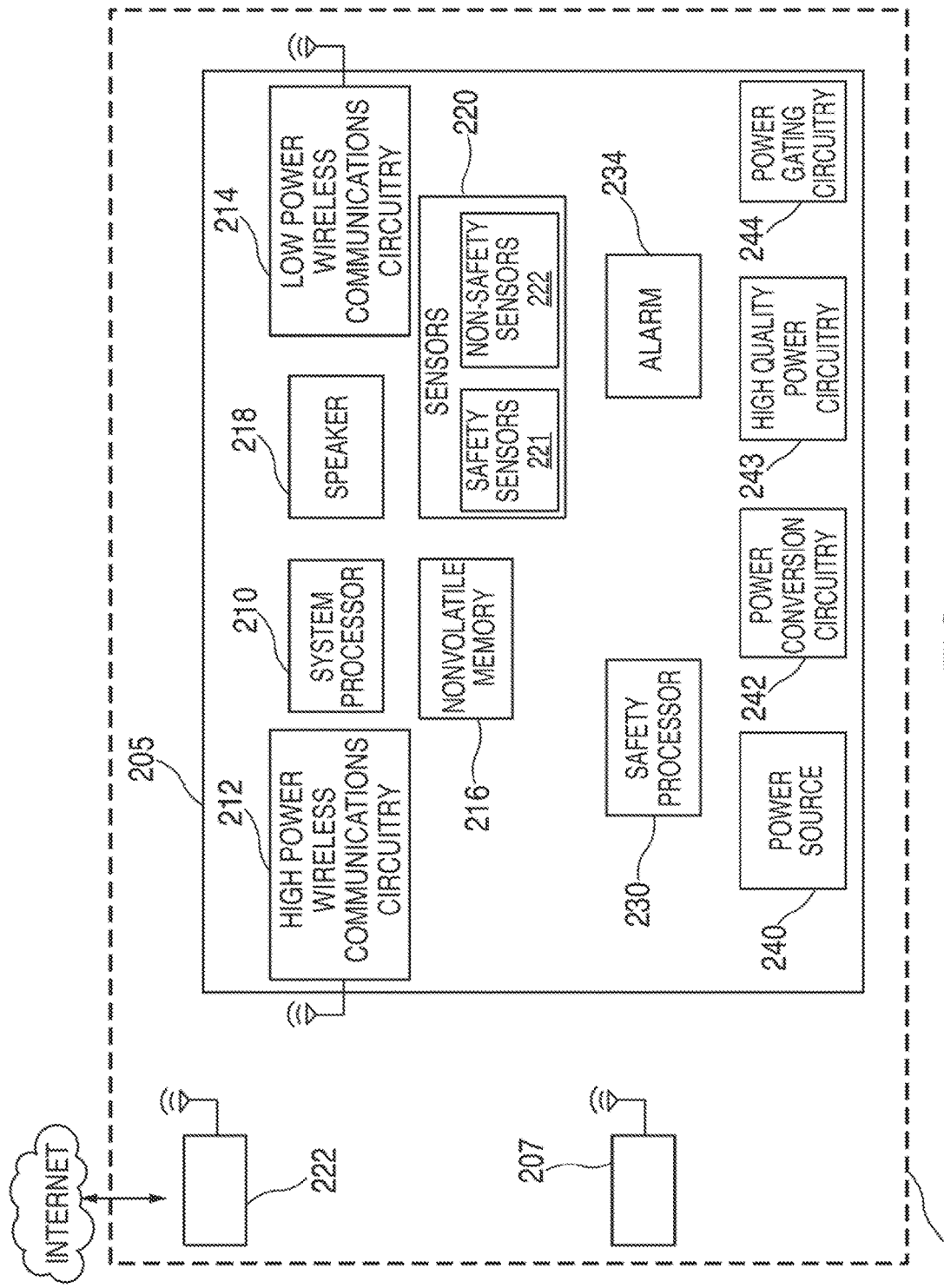
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, and power gating circuitry 244. Hazard detection system 205 is operative to provide failsafe safety detection features and user interface features using circuit topology and power budgeting methods that minimize power consumption. The components of system 205 and an exemplary circuit topology are discussed in connection with FIGS. 2 and 3, and methods and circuitry for detecting gestures are discussed in connection with FIGS. 4-21.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. That is, when both processors 210 and 230 are active, processor 210 consumes more power than processor 230. Similarly, when both processors are inactive, processor 210 still consumes more power than processor 230. System processor 210 can be operative to process user interface features and monitor interface sensors 220. For example, processor 210 can direct wireless data traffic on both high and low power wireless communications circuitry 212 and 214, access non-volatile memory 216, communicate with processor 230, and cause audio to be emitted from speaker 218. As another example, processor 210 can monitor interface sensors 220 to determine whether any actions need to be taken (e.g., shut off a blaring alarm in response to a user detected action to hush the alarm).

Safety processor 230 can be operative to handle safety related tasks of system 205, or other types of tasks that involve monitoring environmental conditions (such as temperature, humidity, smoke, carbon monoxide, movement, light intensity, etc.) exterior to the hazard detection system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core alarming features of system 205 will operate regardless of whether processor 210 is functioning. By way of example and not by way of limitation, system processor 210 may comprise a relatively high-powered processor such as Freescale Semiconductor K60 Microcontroller, while safety processor 230 may comprise a relatively low-powered processor such as a Freescale Semiconductor KL15 Microcontroller. Overall operation of hazard detection system 205 entails a judiciously architected functional overlay of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; algorithms for facilitating updates to the programmed functionality of one or more elements of the hazard detection system 205 such as the safety processor 230, the high power wireless communications circuitry 212, the low power wireless communications circuitry 214, the system processor 210 itself, etc., and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions such that it performs are judiciously selected and timed such the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using Broadcom part number BCM43362, available in a module from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as Wi-Fi update mode, software update mode, or alarm mode, circuitry 212 can be in an active state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to an 802.15.4 protocol. For example, in one embodiment, circuitry 214 can be part number EM357 SoC available from Silicon Laboratories. Depending on the operating mode of system 205, circuitry 214 can operate in a relatively low power "listen" state or a relatively high power "transmit" state. When system 205 is in the Idle, WiFi update (which may require use of the high power communication circuitry 212), or software update modes, circuitry 214 can be in the "listen" state. When system 205 is in the Alarm mode, circuitry 214 can transmit data so that the low power wireless communications circuitry in system 207 can receive data indicating that system 205 is alarming. Thus, even though it is possible for high power wireless communications circuitry 212 to be used for listening for alarm events, it is more power efficient to use low power circuitry 214 for this purpose. Power savings is further realized when several hazard detection systems or other systems having low power circuitry 214 form an interconnected wireless network.

Power savings is also realized because in order for low power circuitry 214 to continually listen for data transmitted from other low power circuitry, circuitry 214 must constantly be operating in its "listening" state. This state consumes power, and although it may consume more power than high power circuitry 212 operating in its sleep state, the power saved versus having to periodically activate high power circuitry 214 is substantial. When high power circuitry 212 is in its active state and low power circuitry 214 is in its transmit state, high power circuitry 212 consumes substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates. The second protocol can have a much more complicated modulation than the first protocol.

In some embodiments, low power wireless communications circuitry 214 may be a mesh network compatible module that does not require an access point or a router in order to communicate to devices in a network. Mesh network compatibility includes provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point or router in order to communicate to devices in a network. Thus, if a first device having circuitry 212 wants to communicate data to another device having circuitry 212, the first device has to communicate with the router, which then transmits the data to the second device. Thus, there is no device-to-device communication per se when circuitry 212 requires use of a router. In other embodiments, circuitry 212 can perform device-to-device communication using a Wi-Fi Direct communications protocol. The Wi-Fi Direct communications standard can enable devices to connect easily with each other without requiring a router. For example, an exemplary use of Wi-Fi Direct can enable hazard detection system 105 to directly communicate with thermostat 110.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warning in one or more languages. Speaker 218 can be any suitable speaker operable to playback sounds or audio files. Speaker 218 can include an amplifier (not shown).

Interface sensors 220 can includes sensors that are monitored by system processor 210 and safety sensors 232 can include sensors that are monitored by safety processor 230. Sensors 220 and 232 can be mounted to a printed circuit board (e.g., the same board processor 210 and 230 are mounted to), a flexible printed circuit board, a housing of system 205, or a combination thereof. Interface sensors 220 can be non-safety related sensors. Interface sensor 220 can include one or more ultrasonic sensors 221, which generate high frequency sound waves and determine which wave(s) are received back by the sensor. Interface sensors 220 can include a passive infra-red (PIR) sensor 222. PIR sensor 222 can be used for various motion detection features. A PIR sensor can measure infrared light radiating from objects in its field of view. In one embodiment, one of the user interface features is a gesture hush feature, a feature in which a user performs a gesture (e.g., a wave motion) in the vicinity of system 205 to cause it to turn off or silence alarm 234 if it is blaring. One or more of ultrasonic sensors 221, PIR sensor 220, or a combination of both ultrasonic sensors 221 can be used to detect this gesture in accordance with various embodiments. The gesture hush feature and systems and methods for detecting and processing the gesture hush feature are discussed in more detail below in connection with FIGS. 4-13. Interface sensors 220 may optionally include an ambient light (ALS) sensor and a push-button sensor. An ALS sensor detects ambient light and the push-button sensor can be a switch, for example, that detects a user's press of the switch.

Safety sensors 232 can include a smoke detector, a carbon monoxide (CO) sensor, temperature and humidity sensor, one or more thermistors. Smoke detectors detect smoke and typically use optical detection, ionization, or air sampling techniques. A CO sensor can detect the presence of carbon monoxide gas, which in the home, is typically generated by open flames, space heaters, water heaters, blocked chimneys, and automobiles. The material used in electrochemical CO sensors typically has a 5-7 year lifespan. Thus, after 5-7 year period has expired, the CO sensor should be replaced. A temperature and humidity sensor can provide relatively accurate readings of temperature and relatively humidity. A thermistor is a type of resistor whose resistance varies based on temperature. Thermistors can include NTC type thermistors or PTC type thermistors. Safety sensors 232 can optionally include PIR sensor, an ambient light sensor, and a push-button sensor. If interface sensors 220 do not include the PIR sensor, ambient light sensor, or push-button sensor, then safety sensors 232 can include them.

Sensors 220 can be monitored by safety processor 230 (and, in some embodiments, system processor 210), and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but provide the acquired sensor data to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors would only include a smoke sensor and at least one heat sensor. Other sensors, such as non-safety sensors, could be included as part of system 205, but would not be needed to detect smoke or fire. As another example, if the hazardous condition includes carbon monoxide, then the safety sensor would be a carbon monoxide sensor, and no other sensor would be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following safety sensors 221: a smoke detector, a carbon monoxide (CO) sensor, and one or more heat sensors. Smoke detectors detect smoke and typically use optical detection, ionization, or air sampling techniques. A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. Furthermore, in this embodiment, detection system 205 can include the following non-safety sensors 222: a humidity sensor, an ambient light sensor, a push-button sensor, a passive infra-red (PIR) sensor, and one or more ultrasonic sensors. A temperature and humidity sensor can provide relatively accurate readings of temperature and relative humidity. An ambient light sensor (ALS) sensor detects ambient light and the push-button sensor can be a switch, for example, that detects a user's press of the switch. PIR sensor 222 can be used for various motion detection features. A PIR sensor can measure infrared light radiating from objects in its field of view. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 are mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 does not need any of the data acquired from non-safety sensor 222 to perform its hazard monitoring and alerting functions, the non-safety sensor data can be utilized to provide enhanced hazard system 205 functionality.

Alarm 234 can be any suitable alarm that alerts users in the vicinity of system 205 of the presence of a hazard condition. Alarm 234 can also be activated during testing scenarios. Alarm 234 can be a piezo-electric buzzer, for example.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 can include one or more batteries or a battery pack. The batteries can be constructed from different compositions (e.g., alkaline or lithium iron disulfide) and different end-user configurations (e.g., permanent, user replaceable, or non-user replaceable) can be used. In one embodiment, six cells of Li—$FeS_2$ can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors such as smoke detectors and CO sensors may require a relatively stable voltage in order to operate properly.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, the power gating circuitry itself may consume a finite amount of power. This finite power consumption, however, is less than the quiescent power loss of the component.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

Figure 3:
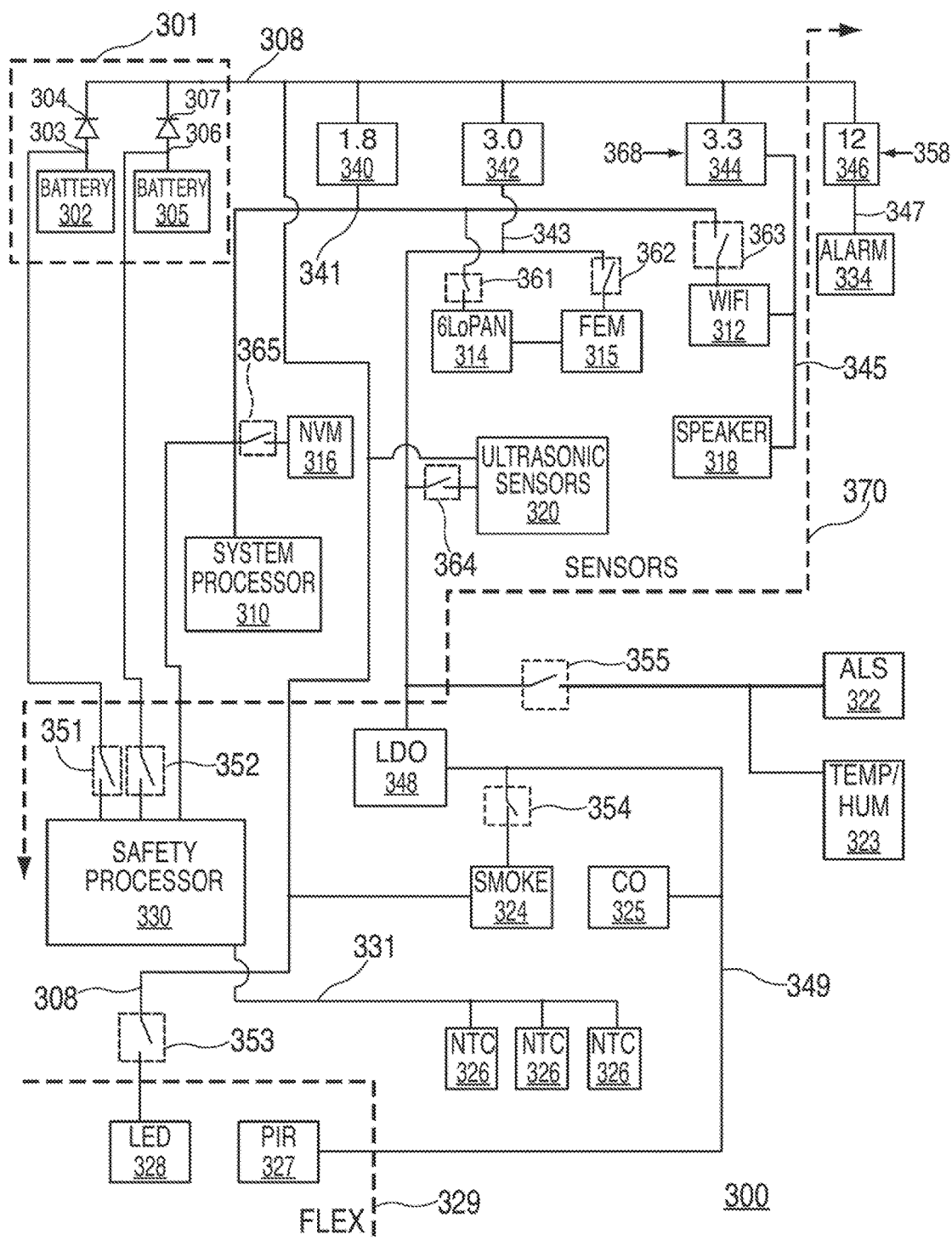
FIG. 3 shows an illustrative circuit schematic of a hazard detection system, according to some embodiments.

FIG. 3 shows an illustrative circuit schematic of hazard detection system 300 according to an embodiment. The circuit schematic is a more detailed illustrative representation of hazard detection system 205 (of FIG. 2) and shows, among other things, power consuming components, the power busses supplying power to the components, and gating circuitry for selecting coupling and de-coupling components to a power bus. Hazard detection system 300 can be powered solely by one or more batteries and uses a power budgeting scheme so that the one or more batteries can power system 300 for a minimum operational lifetime (e.g., of at least seven (7) years). The power budgeting scheme further enables system 300 to operate according to any one of several different modes (e.g., Idle, WiFi update, Software update, and Alarm) for a mode-specified period of time (e.g., WiFi update mode is performed once a day) during the minimum operational lifetime. In the discussion that follows, the circuit arrangement of system 300 illustrates how system 300 is able to manage its power consumption, while providing enhanced user interaction features as well as robust hazard detection.

Hazard detection system 300 includes battery system 301 operative to provide a DC power source to power bus 308. The DC power source can exist on power bus 308 at a first voltage level. The voltage level may change slightly depending on various conditions, such as changes in temperature. Depending on composition of DC power source (e.g., alkaline or Lithium-based chemistries), the voltage level can remain at a relatively constant voltage level (e.g., 4.5 volts) or it may remain within a pre-defined range of voltage levels during the operational life of system 300. The voltage level may drop substantially when the energy stored in battery system 301 falls below a predetermined threshold (e.g., when the batteries are effectively dead). Battery system 301 can include battery cell group 302 and battery cell group 305. Each of battery cell groups 302 and 305 can include one or more battery cells. In one embodiment, each cell group includes three battery cells. As shown, battery cell group 302 is coupled to diode 304 and to safety processor 330 via bus 303 and gating circuitry 351. Safety processor 330 is similar in many respects to safety processor 230 (discussed above in connection with FIG. 2). Battery cell group 305 is coupled to diode 307 and to safety processor 330 via bus 306 and gating circuitry 352. Safety processor 330 can temporarily close gating circuitry 351 and 352 to measure the voltages of battery groups 302 and 305, respectively. After the measurement is complete, safety processor 330 can open gating circuitry 351 and 352. Diodes 304 and 307 are coupled to power bus 308.

Power bus 308 is coupled to power converter circuitry 340, power converter circuitry 342, power converter circuitry 344, power converter circuitry 346, ultrasonic sensor 320, smoke detector 324, and display module 328 (e.g., light emitting diode (LED)) via power gating circuitry 353. As discussed above in connection with FIG. 2, power converting circuitry is operative to convert a signal from one level to another. Ultrasonic sensor 320 can be similar to the ultrasonic sensor referenced in connection with interface sensors 220 (of FIG. 2). Although only one ultrasonic sensor is shown, system 300 can include more than one ultrasonic sensor. In one embodiment, system 300 can include two ultrasonic sensors. For example, one ultrasonic sensor may be positioned within the housing of the system to detect ultrasonic events when mounted to a ceiling and the other sensor may be positioned within the house to detect ultrasonic events when mounted to a wall. Smoke detector 324 can be one of the safety sensors (as previously discussed). Display module 328 can be any suitable display apparatus. In one embodiment, display module 328 can include one or more LEDs that emit different colored light to signify a status of system 300. For example, display of green light can signify good status, orange light can signify a warning condition such as a low battery, and red light can signify a hazard condition. Each of the components power bus 308 is coupled to receive DC power at the first voltage level.

Although ultrasonic sensor 320, smoke detector 324, and display module 328 can operate using DC power at the first voltage level, other components in system 300 can require different operating voltages. In addition, it is understood that although various components such as ultrasonic sensor 320, smoke detector 324, and display module 328 can receive power from power bus 308 at a first voltage level, one or more of these components may have internal power conversion circuitry. For example, ultrasonic sensor 320 and display module 328 can each include a boost converter.

Power converter circuitry 340, 342, 344, and 346 are each operative to convert the DC power signal provided on power bus 308 to a signal having a different voltage level. Power converter circuitry 340, 342, and 344 can all be operative to down convert the DC power signal to three different voltage levels lower than the first voltage level. More particularly, power converter circuitry 340 can be a buck converter that provides a signal having a second voltage level (e.g., 1.8 volts) to power bus 341. Power bus 341 is coupled to system processor 310 (e.g., which can be similar to processor 210 of FIG. 2), safety processor 330, 6LoWPAN module 314 (e.g., which can be similar to low power wireless communication circuitry 214 of FIG. 2) via power gating circuitry 361, WiFi module 312 (e.g., which can be similar to high power wireless communication circuitry 212 of FIG. 2) via power gating circuitry 363, and non-volatile memory 316 (e.g., which can be similar to non-volatile memory 216) via power gating circuitry 365.

Some of the sensors may include subcomponents that have separate power requirements, and as such, may need to be separately powered. Such sensors may be coupled to receive power from two or more power busses so that the subcomponents are supplied with the appropriate power. In some embodiments, one or more of the subcomponents of a sensor may be power gated ON and OFF. For example, smoke detector 324 can be an active sensor that "interrogates" air contained within a chamber with an active IR signal, and then measures the IR signal to see how much of that signal is scattered. Thus, in some embodiments, smoke detector 324 can include a smoke detection optical source (a first subcomponent) and a smoke detection optical sensor (a second subcomponent), with each of these components being separately powered. In particular, power bus 308 can provide power to the smoke detection optical source and power bus 343 can provide power to the smoke detection optical sensor via power gating circuitry 354. During operation of hazard detection system 300, the smoke detection optical sensor may be selectively powered via controlled coupling and de-coupling to power bus 343 by power gating circuitry 354. Although the smoke detection optical source is coupled to power bus 308, it may be turned ON and OFF in response to a driving signal (e.g., provided by safety processor 330). Thus, in this embodiment, power savings can be achieved by (1) signal driving the smoke detection optical source and by (2) power gating the smoke detection optical sensor.

As another example, ultrasonic sensor 320 can include a transmit/boost subcomponent and a transducer subcomponent, with each of these subcomponents being separately powered. The transmit/boost component may be coupled to receive power from power bus 308 and the transducer subcomponent may be coupled to receive power from power bus 349 via power gating circuitry 364. During operation of hazard detection system 300, for example, the transducer subcomponent may be power gated ON and OFF via power gating circuitry 364 and the transmit/boost subcomponent may be signal driven ON and OFF. Thus, although the transmit/boost subcomponent can be directly coupled to power bus 308, the transmit/boost subcomponent may not be turned ON unless it is signal driven ON (e.g., by a signal provided by system processor 310), thereby minimizing power consumption. Thus, power consumption by ultrasonic sensor 320 can be minimized using two different approaches: power gating and signal driving. It is understood that other sensors may utilize similar approaches to minimize power consumption and extend battery life. It is further understood that some sensors may not include subcomponents that are coupled to power gating circuitry, but such subcomponents can be turned ON and OFF via signal driving.

Power converter circuitry 342 can be a buck converter that provides a signal having a third voltage level (e.g., 3.0 volts) to power bus 343. Power bus 343 is coupled to RF Front-End Module (FEM) 315 via power gating circuitry 362, ultrasonic sensor 320 via power gating circuitry 364, both ALS sensor 322 and temperature and humidity sensor 323 via power gating circuitry 355, and low-drop out regulator 348. Ultrasonic sensor 320 receives power on power busses 308 and 343. RF FEM 315 operates in connection with 6LoWPAN module 314 and can include a power amplifier (PA) for transmitting data, a low-noise amplifier (LNA) for receiving data, an optional antenna switch, and an optional transmit/receive switch. The PA boosts the power of the transmitting signal to improve signal range and the LNA improves sensitivity when receiving a signal. 6LoWPAN module 314 can optionally leverage FEM 315 to improve its performance, but doing so incurs a power penalty. ALS sensor 322 and temperature and humidity sensor 323 can be similar to safety sensors 232 discussed above in connection with FIG. 2.

Power converter circuitry 344 can be a buck converter that provides a signal having a fourth voltage level (e.g., 3.3 volts) to power bus 345. Power converting circuitry 344 can be operative to be selectively turned ON and OFF, depending on a signal applied to node 368. The signal applied to node 368 can be provided by system processor 310. Power bus 345 can be coupled to WiFi module 312 and speaker 318. Speaker 318 can be similar to speaker 218 (discussed above in connection with FIG. 2). The fourth voltage level can be higher than the third voltage level. Even though WiFi module 312 and speaker 318 could operate using the third voltage level, use of the fourth voltage level results in a performance boost. The increased operating voltage can increase the wireless range of WiFi module 312 and increase the loudness of speaker 318. In some embodiments, power converter circuitry 344 can be omitted and WiFi module 312 and speaker 318 can be coupled to power bus 343. WiFi module 312 is coupled to power bus 341 via gating circuitry 363 to receive power for its digital circuitry, logic, and to communicate with system processor 310 and is coupled to power bus 345 to receive power for its radio and transceiver. Thus, as shown, WiFi module 312 can have its digital logic circuitry power gated ON and OFF by gating circuitry 363, and its radio and transceiver can be powered ON and OFF depending on whether power converter circuitry 344 is turn ON.

Power converting circuitry 346 can be operative to up convert the DC power signal to a voltage level higher than the first voltage level. Power converting circuitry 346 can be operative to be selectively turned ON and OFF, depending on a signal applied to node 358. Power converting circuitry 346 can be a boost converter that provides a signal having a fifth voltage (e.g., 12 volts) to power bus 347. Alarm 334 can be similar to alarm 234 (discussed above in connection with FIG. 2).

It is understood that although power converting circuitry 340, 342, 344, 346 were described above as having either a buck converting topology or boost converting topology, any suitable converting topologies can be used. For example, other DC-DC converting topologies such as buck-boost can be used. In addition, converting topologies that use transformers can be used, such as, for example, full-bridge forward converters, half bridge forward converters, single-ended converters, push pull converters, and clamp converters.

Low-dropout regulator 348 is operative to provide "high" quality, stable, power to power bus 349. Low-dropout regulator 348 can change the voltage level of the signal it receives on power bus 343 to provide a sixth voltage level to power bus 349. The quality of the signal on power bus 349 is higher than the quality of the signal on power bus 343. Signal quality can be measured by any number of different characteristics. A few characteristics include voltage ripple, deviations from an average voltage level, transient response, and noise.

In an explanation by way of example, assume that power converting circuitry 342 is operative to provide a signal having the third voltage level (e.g., 3.0 volts) to power bus 343 and regulator 348 changes the third voltage level to the sixth voltage level (e.g., 2.7 volts). During operation of system 300, power demands on power bus 343 may temporarily disrupt power converter circuitry 342's ability to provide a signal at the third voltage level. For example, if ultrasonic sensor 320 is turned ON, the current demanded by sensor 320 could cause the voltage of the signal provided to power bus 343 to momentarily drop below the third voltage level. Despite this drop in voltage level, regulator 348 is operative to maintain its output signal at the sixth voltage level, thereby ensuring all components coupled to power bus 349 continue to operate unaffected by changes in the signal on power bus 343.

Power bus 349 can be coupled to smoke detector 324 via power gating circuitry 354, CO sensor 325, and PIR sensor 327. CO sensor 325 can be one of the safety sensors 232 discussed above in connection with FIG. 2. CO sensor 325 may use an electrochemical sensor to detect CO gas. This particular type of sensor requires a relatively stable signal to function properly and it is also the type of sensor that must always be receiving power. The constant power requirement may be necessary because it takes too long for the sensor to stabilize and take accurate CO readings if power gated ON and OFF. CO sensor 325 receives a stable power signal from regulator 348 on power bus 349 and is not power gated, thereby operative to always receive power from power bus 349. PIR sensor 327 is another type of sensor that requires a relatively stable signal to function properly and must always be receiving power.

Smoke detector 324 is coupled to power busses 308 and 349. Power bus 308 powers an infrared (IR) LED and power bus 359 powers receiver and signal amplification circuitry. In some embodiments, power bus 308 can supply power to the IR LED (e.g., smoke detector optical source) through an adjustable LDO (not shown). This LDO can be selectively enabled by safety processor 330, and is only toggled when an LED pulse is required; safety processor 330 can provide a driving signal to the smoke detector optical source (to turn it ON and OFF) and it can also control operation of power gating circuitry 354 to selectively power the receiver and signal amplification circuitry. When an IR LED pulse is not required, the LDO is disabled, and power gating circuitry 354 decouples power bus 359 to the receiver and signal amplification circuitry (e.g., smoke detector optical detector). As a result, when the LDO is disabled and power gating circuitry 354 is OPEN, smoke detector 324 can have a minimal current draw (e.g., less than 1 µA).

System 300 can include one or more thermistors 326 situated in various locations within system 300. Thermistors 326 can be another one of the safety sensors as previously discussed in connection with FIG. 2. As shown, thermistors 326 are NTC type thermistors, though it is understood that other types of thermistors can be used. Thermistors 326 are coupled to safety processor 330 via power bus 331. Safety processor 330 can selectively provide a power signal to power bus 331. For example, when safety processor 330 desires to take temperature readings from thermistor 326, it can provide power to power bus 331. After the reading is taken, processor 330 can shut off the power to power bus 331. In another embodiment, processor 330 can constantly supply power to power bus 331.

The various components and power busses of hazard detection system 300 can reside on one or more printed circuit boards or flexible printed circuit boards. In one embodiment, PIR sensor 327 and display module 328 can reside on flexible printed circuit board 329 and all other components can reside on a printed circuit board (not shown). In another embodiment, all components can reside on a printed circuit board.

FIG. 3 shows a dashed line 370 snaking between various components of system 300. Dashed line 370 demarcates an illustrative divide of components dedicated to providing 1) safety features and 2) enhanced features, and in particular, generally shows how power is managed by processors 310 and 330. Components generally associated with safety features are shown below dashed line 370 and components generally associated with enhanced features are shown above dashed line 370. Dashed line 370 further serves to illustrate the bifurcated processors embodiment in which safety processor 330 is dedicated to safety features and system processor 310 is dedicated to handling enhanced features as well as general system administration. As will be discussed in more detail below, dashed line shows that safety processor 330 manages power consumption of the "safety" components and system processor manages power consumption of the other components.

The safety features of system 300 are robust, power efficient, and operate without fail. To ensure the robust and power efficient use of the safety features, system 300 can operate as follows. Power converting circuitry 340 and 342 can be operative to always be ON (at least during intended and ordinary usage of system 300) throughout its minimum operational lifespan. There may be instances in which power converting circuitry 340 and 342 are not always ON, such as when the system 300 undergoes a full power-cycle reset. This way, power supplied on power busses 341 and 343 is always available to downstream components. These components can include system processor 310, safety processor 330, non-volatile memory 316, low-dropout regulator 348, and the safety sensors (e.g., ALS sensor 322, temperature and humidity sensor 323, smoke detector 324, CO sensor 325, thermistors 326, and PIR sensor 327). That safety processor 330 and the safety sensors have access to power via always ON power converting circuitry 340 and 342 ensures that system 300 is constantly monitoring for hazard events.

Power savings can be realized because safety processor 330, as opposed to system processor 310, is dedicated to monitoring the safety sensors for a hazard condition. Additional power savings can be realized by power gating various components. In particular, safety processor 330 can independently control each of power gating circuits 353, 354, and 355. Thus, processor 330 can selectively couple and de-couple display module 328 to power bus 308, smoke detector 324 to power bus 349, and both ALS sensor 322 and temperature and humidity sensor 323 to power bus 353 by controlling power gating circuits 353, 354, and 355, respectively. Since display module 328, smoke detector 324, and both ALS sensor 322 and temperature and humidity sensor 323 can operate properly even when being fully turned ON and OFF, system 300 can further manage power consumption by selectively disconnecting them from their respective power busses. Further still, processor 330 can extract additional power savings by selectively providing power to power bus 331.

Safety processor 330 can further manage power consumption by selectively enabling power converting circuitry 346. Processor 330 can enable or disable circuitry 346 by applying the appropriate signal to control node 358. When converting circuitry 346 is enabled, it can provide a signal at the fifth voltage level to power bus 347. Processor 330 can enable circuitry 346 when a hazard event is detected, and once circuitry 346 is enabled, alarm 334 is operative to sounds its alarm. When no hazard event is detected or there is no need for alarm 334 to be active, processor 330 can disable circuitry 346. Disabling circuitry 346 saves power lost during the operation of circuitry 346 and as well as power that would otherwise be consumed by alarm 334.

Power management can also be exercised by processor 310. Processor 310 can independently control each of power gating circuits 361, 362, 363, 364, and 365. Thus, processor 310 can selectively couple and de-couple 6loWPAN module 314 to power bus 341, FEM 315 to power bus 343, WiFi module 312 to power bus 341, non-volatile memory 316 to power bus 341, and ultrasonic sensor 320 to power bus 343 by controlling power gating circuits 361, 362, 363, 364, and 365, respectively. These power-gating compatible components can be completely disconnected from a power bus and still be able to function properly when re-connected to their respective power busses.

System processor 310 can further manage power consumption by selectively enabling power converting circuitry 344. Processor 310 can enable or disable circuitry 344 by applying the appropriate signal to control node 368. When converting circuitry 344 is enabled, it can provide a signal at the fourth voltage level to power bus 345. Processor 310 can enable circuitry 344 when WiFi module 312 and speaker 318 require power. Disabling circuitry 344 saves power lost during the operation of circuitry 344 and as well as power that would otherwise be consumed by WiFi module 312 and speaker 318.

System processor 310 and safety processor 330 can operate according to several different power modes. For example, in a very simplistic sense, both processors 310 and 330 can operate in an active mode and a sleep mode. As another example, one or more of processor 310 and 330 can have multiple active modes and multiple sleep modes, each having a different power consumption level. The particular mode each processor operates in may depend on the mode operation of the system 300. For example, if system 300 is in an Idle mode of operation, system processor 310 may be a relatively deep sleep mode, and safety processor 330 may be in a relatively low power active mode.

Although system 300 is shown and described to include battery system 301, it is understood that battery system 301 can be replaced with a line powered power supply. For example, the line powered power supply can include an AC-to-DC converter, among other circuitry, to convert an AC signal to a DC signal that is provided to bus 308. Additional details of a line-powered hazard detection system can be found, for example, in commonly assigned U.S. Publication No. 2015/0021993, the disclosure of which is incorporated by reference herein in its entirety.

Figure 4A:
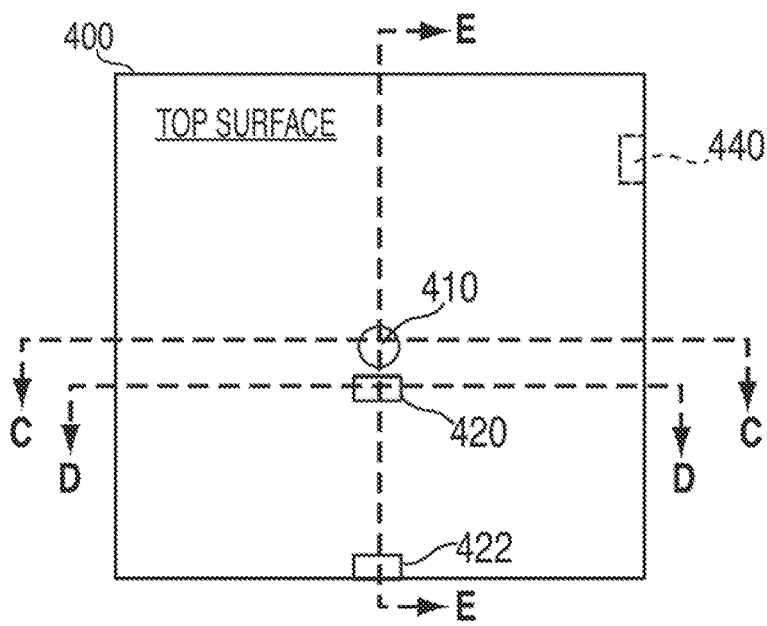
FIGS. 4A-4E show different views of a hazard detection system along with its illustrative positioning of several interface sensors, according to some embodiments.
Figure 4B:
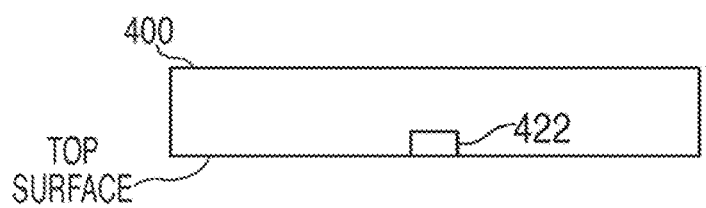
Figure 4C:
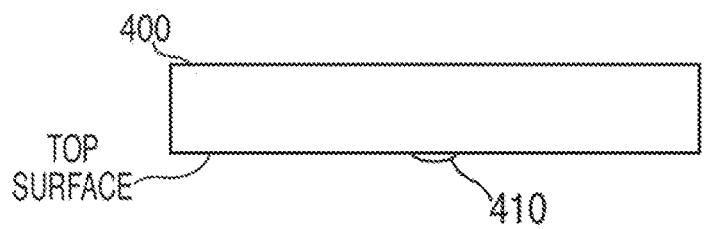
Figure 4D:
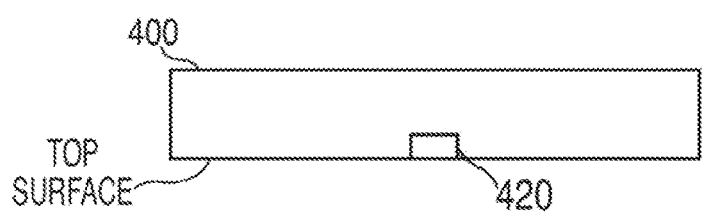

FIGS. 4A-4D show different views of input processing detection system 400 along with its illustrative positioning of several sensors in accordance with various embodiments. In particular, FIG. 4A shows a top view of system 400, FIG. 4B shows a side view of system 400, FIG. 4C shows a cross-sectional view of system 400 taken along line C-C of FIG. 4A, and FIG. 4D shows a cross-sectional view of system 400 taken along line D-D of FIG. 4A. A top portion of detection system 400 is shown facing up out of the page in FIG. 4A, but the top portion of system 400 is shown facing in a downward fashion (which is how it would face if mounted to a ceiling). FIG. 4A shows that detection system 400 includes four sensors located at different locations in or on a housing. In one embodiment, the sensors can include PIR sensor 410, ultrasonic sensor 420, ultrasonic sensor 422, button 440, and an ambient light sensor (not shown). PIR sensor 410 and ultrasonic sensor 420 can be located in a relatively centered location within system 400. Both sensors 410 and 420 are also positioned at or near the top surface of system 400, and in some embodiments may extend beyond a plane that defines the top surface. For example, as illustrated in FIG. 4C, PIR sensor 410 may extend beyond the top surface plane. As another example, as illustrated in FIG. 4D, ultrasonic sensor 420 may be positioned substantially co-planer with the top surface.

Ultrasonic sensor 422 can be positioned near an edge of system 400 (as shown) or elsewhere on system 400. For example, sensor 422 can be positioned adjacent to sensor 422. Similar to sensor 420, sensor 422 may also be positioned at or near the top surface of system 400, and in some embodiments may extend beyond a plane that defines the top surface. For example, as shown in FIG. 4B, sensor 422 may be positioned substantially co-planer with the top surface. Button 440 can be positioned anywhere on hazard system 400 such that a user can depress it. For example, as shown in FIG. 4A, button 440 can be recessed within a boundary of hazard system 400.

Figure 4E:
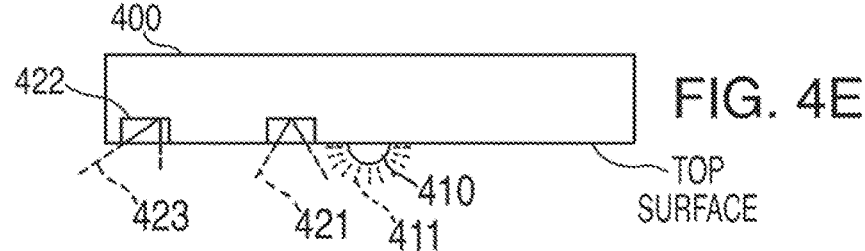

FIG. 4E shows an illustrative cross-sectional view of hazard system 400 taken along line E-E of FIG. 4A. This view shows sensors 410, 420, and 422 and the respective detection fields 411, 421, and 423. Detection fields 411, 421, and 423 illustrate each sensor's "field of view" for detecting one or more stationary or moving objects. The size and shape of each sensor's "field of view" can be different. For example, PIR sensor 410 can have a relatively omnipresent detection field and ultrasonic sensors 420 and 422 can have relatively focused detection fields. In one embodiment, detection field 411 can encompass both detection fields 421 and 423. Detection fields 421 and 423 may or may not overlap each other, but each field can be configured to monitor a different field of view. For example, detection field 421 can be centered on an axis that is perpendicular to the top surface of hazard system 400, and detection field 423 can be centered on an axis that is not perpendicular to the top surface of hazard system 400. In another example, the center axes of detection field 421 and detection field 423 are not parallel to each other. During operation, ultrasonic sensors 420 and 422 can be alternately sampled to avoid interference among detection fields 421 and 423.

The combined use of ultrasonic and infrared sensors enables an ultrasound-plus-IR detection methodology for discerning whether one or more objects are actually present within a particular field of view and for processing inputs received while the one or more objects are present within that field of view. As will be illustrated and discussed in more detail below in connection with FIGS. 5A and 5B, the ultrasonic sensor provides a relatively focused field of view by emitting high frequency sound waves and monitoring for echoes that are received back from any objects within its field of view, and the infrared sensor provides a relatively unfocused field of view, which can encompass all or a portion of the ultrasonic sensor's field of view, by monitoring energy being emitted from objects in its field of view. Thus, even though both sensors can detect objects, the disparate nature of the sensors enables the detection methodology to discriminate among different moving objects and process inputs with a relatively high degree of accuracy. In particular, the ultrasonic sensor can provide "presence" detection and the infrared sensor can provide "input processing" detection. While the infrared sensor can detect movement of one or more objects anywhere within its field of view, the detection methodology can decide whether to process an infrared detected moving object as an "input" based on whether the ultrasonic sensor senses the "presence" of that moving object. Thus, in one embodiment, the detection methodology can selectively filter out infrared detected moving objects if the ultrasonic sensor does not detect the presence of the moving object. This can reduce or completely eliminate false positives. For example, the infrared sensor may detect movement of an object within its field of view, but if that same object is not detected by the ultrasonic sensor, the detection methodology can ignore that detected moving object and not process it as an input. As another example, if the infrared sensor detects movement of an object, and that same object is detected by the ultrasonic sensor, the detection methodology may process it as an input The ultrasound-plus-IR detection methodology can be used in many different applications. In some embodiments, the detection methodology according to various embodiments can be used to process inputs in response to one or more objects moving relatively far away (e.g., a few meters) from the input processing system. In other embodiments, the detection methodology can be used to process inputs in response to one or more objects moving relatively close (e.g., a few feet) to the input processing system. Regardless of the proximity of the moving objects, the input processing system can recognize different movement patterns or gestures. Each recognized movement pattern may cause a particular action to be performed. It is understood that the particular action taken depends on the design of system using the ultrasound-plus-IR detection methodology. In a personal computing system, for example, an up and down movement pattern may correspond to a scrolling UI interface action. As another personal computing example, a left to right movement pattern may correspond to a page turning UI interface action. In a hazard detection system, for example, a waving motion pattern may correspond to a silence the alarm interface action. A stereo system, for example, may adjust the volume responsive to the relative distance between two hands; as the distance between the hands increases, the volume increases.

The ultrasound-plus-IR detection methodology is a specific example of a ultrasound-plus-radiation detection methodology according to embodiments herein. Ultrasound-plus-radiation detection methodologies can use an ultrasonic sensor and another sensor that monitors any type of radiation, particularly, non-ionizing radiation. Other embodiments that leverage ultrasonic sensors can incorporate use of an optical sensor (e.g., camera). Such embodiments can employ the ultrasound-plus-image detection methodology, where the ultrasonic sensor is used for presence detection, and the image is used for processing inputs.

Even though various embodiments discussed herein use an ultrasonic sensor for "presence" detection and a PIR sensor for "input processing" detection, it is understood that different sensors may be used for performing presence detection and input processing detection. For example, the following can be used for presence detection: thermopile sensor, carbon dioxide sensor, Laser/IR LED proximity sensor (for measuring reflected light intensity), Laser/IR LED time-of-flight sensor (for measuring time for light to bounce off target and come back), ultrasonic sensor (for measuring reflected sound), ultrasonic sensor (for measuring Doppler shift), a camera, radar, and radio frequency. For example, the following can be used to detection motion: PIR sensor, multi-pixel thermopile, single or multiple Laser/IR LED proximity sensors, single or multiple Laser/IR LED time-of-flight sensors, ultrasonic (reflected sound), ultrasonic (Doppler shift), single or multiple cameras, radar, and radio frequency.

Figure 5A:
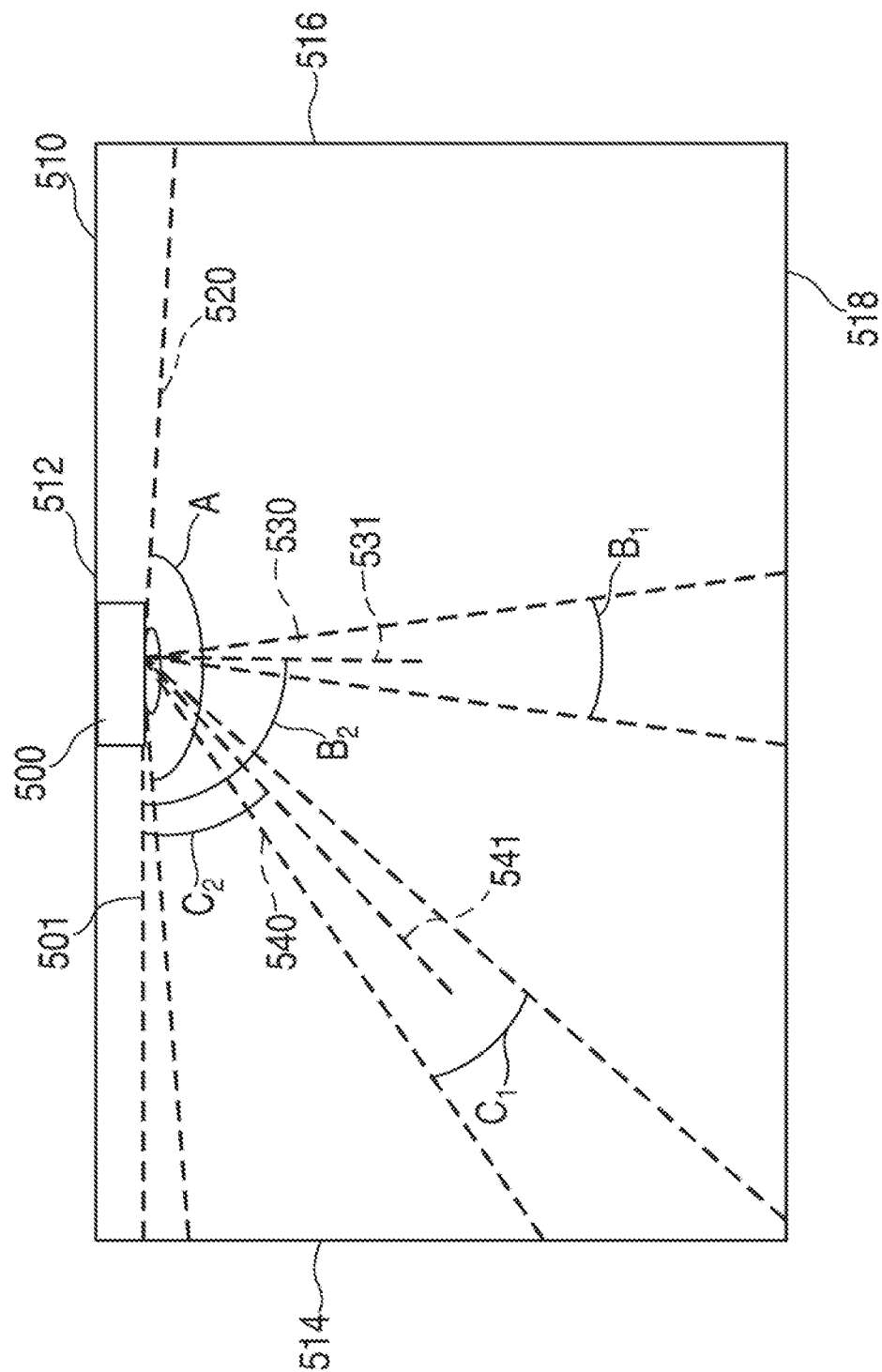
FIG. 5A shows illustrative detection fields emanating from interface sensors of hazard detection system mounted in a first position, according to some embodiments.

Referring collectively now to FIGS. 5A and 5B, illustrative detection fields emanating from sensors (not shown) of hazard detection system 500 are shown in accordance with various embodiments. In particular, FIG. 5A hazard detection system 500 is mounted to ceiling 512 of enclosure 510, and FIG. 5B hazard detection system 500 is mounted to wall 514 of enclosure 510 are shown in accordance with an embodiment. Hazard detection system 500 can be the same for both FIGS. 5A and 5B, and thus various aspects described in connection with one FIG. can apply to the other FIG. For example, the detection fields and their respective field of view angles and center axis positions can be the same for both FIGS. The main difference between FIG. 5A and FIG. 5B is where hazard detection system 500 is mounted. In FIG. 5A, it is mounted to a ceiling (or other object that is substantially parallel to the ground), and in FIG. 5B, it is mounted to a wall (or other object that is substantially perpendicular to the around). Enclosure 500 can include ceiling 512, walls 514 and 516, and floor 518.

Three different detection fields are shown: PIR detection field 520, ultrasonic detection field 530, and ultrasonic detection field 540. Each detection field shows a series of dashed lines that represent each field's outer bounds. PIR detection field 520 can stem from a PIR sensor (not shown), and ultrasonic detection fields 530 and 540 can stem from ultrasonic sensors (not shown). Although the fields appear to be two-dimensional, it is understood that the fields occupy a three-dimensional space. As shown, PIR detection field 520 can occupy a vast majority of enclosure 510 due to its relatively large, wide angle field of view. In particular, PIR detection field 520 can have field of view angle, A, as shown. Ultrasonic detection fields 530 and 540 can each occupy a minority of enclosure 510 due to their relatively small, narrow angle fields of view. In particular, detection fields 530 and 540 can have field of view angles, B1 and C1, respectively as shown. The value of angle A can be greater than the values of angles B1 and C1. The values of angles B1 and C1 can be the same or different.

Detection fields 530 and 540 are shown with respective center axes 531 and 541. Detection field 520 can have a center axis, but it is not shown to avoid overcrowding the FIG. In some embodiments, the center axes of detection fields 520 and 530 can be co-planer or co-axial, but the center axes of detection fields 530 and 540 are neither co-planer nor co-axial. The positions of the center axes with respect to reference plane 501 vary. As shown, an angle of B2 exists between center axis 531 and reference plane 501, and an angle of C2 exists between center axis 541 and reference plane 501. Angle B2 can be greater than angle C2.

The value of angles B2 and C2 can be selected to maximize the potential for the ultrasonic sensors (not shown) to detect the presence of one or more moving or stationary objects, regardless of how hazard detection system 500 is mounted. For example, angle B2, for detection field 530, can be selected for ceiling mounted applications, and angle C2, for detection field 540, can be selected for wall mounted applications. Continuing with this example, angle B2 can range from 80-100 degrees, and angle C2 can range from 5 to 80 degrees. It is understood that any suitable angle can be selected for angles B2 and C2, respectively. For example, in one embodiment angle B2 can range from 90 to 180 degrees and angle C2 can range from 0 to 90 degrees. As a specific example of this embodiment, angle C2 can be 45 degrees and angle B2 can be 135 degrees.

As shown in FIG. 5B, center axis 531 is substantially perpendicular to wall 514, and as a result detection field 530 projects in a direction substantially perpendicular to wall 514. In some embodiments, depending on the height at which system 500 is mounted, detection field 530 may not be ideally suited for detecting an object (e.g., a person attempting to gesture hush an audible alarm). This may be because the person is not tall enough to reach detection field 530. Detection field 540, which is directed downwards towards floor 518, may be better suited for detecting the object. This may be because the person will eventually enter detection field 540 regardless of how tall he or she is. Thus, in wall mounted applications, objects detected in detection field 540 may take precedence over any objects detected in detection field 530.

In contrast, in ceiling mounted applications (FIG. 5A), objects detected in detection field 530 may take precedence over objects detected in detection field 540. As shown, center axis 531 is substantially perpendicular to ceiling 518, and as a result detection field 530 projects directly towards floor 518, regardless of how high the ceiling is with respect to the floor. Detection field 540 is also directed downwards to the floor, but not as directly as detection field 530. In some embodiments, depending on ceiling height, detection field 540 may be cast too far away from hazard detection system 500 to effectively detect an object (e.g., a person attempting to gesture hush an audible alarm). Thus, detection field 530 may be better suited for detecting an object in ceiling mounted applications.

In some embodiments, hazard detection system 500 can selectively enable and disable one or more of its ultrasonic sensors. For example, system 500 can disable an ultrasonic sensor based on how it is mounted. System 500 can have an orientation sensor contained therein such as, for example, a multi-axis accelerometer, for determining its mounted orientation. If system 500 is wall mounted, it can disable the sensor casting detection field 530. If system 500 is ceiling mounted, it can disable the sensor casting detection field 540.

In one embodiment, angles B2 and C2 are permanently fixed. In another embodiment, one or more of angles B2 and C2 are adjustable. For example, one or more of the ultrasonic sensors (not shown) can be pivoted about a rotation axis to change the angle of its central axis with respect to reference plane 501. In one embodiment, a user can manually pivot an ultrasonic sensor. In another embodiment, hazard system 500 can control the pivot position of one or more ultrasonic sensors. For example, the sensor can be mounted on a motor controlled gimbal platform. The ability to change the center axis angle can be particularly advantageous to accommodate wall mounts of varying heights. For example, the hazard detection system can adjust the center axis angle of a detection field based on the mount height.

FIGS. 6A-6D show illustrative snapshots in time in which a person uses a gesture to silence an audible alarm in accordance with an embodiment, and FIG. 7 shows an illustrative timing diagram of various components of a hazard detection system in accordance with an embodiment. The snapshots of FIGS. 6A-6D can correspond to times, $t_1$-$t_4$, respectively, of FIG. 7. Any suitable hazard detection system in accordance with an embodiment can be used, but for convenience and ease of discussion, hazard detection system 500 of FIG. 5A is referenced in connection with FIGS. 6A-6D and FIG. 7. Accordingly, as already discussed above, system 500 can cast detection fields 520, 530, and 540 as shown. In addition, the hazard detection system can include, among other components, a PIR sensor, two ultrasonic sensors, an alarm, a speaker, and one or more hazard detection sensors.

FIG. 7 shows illustrative timing waveforms for alarm event 702, PIR sensor sample rate 704, ultrasonic sensor enable 705, first ultrasonic sensor object detection waveform 706, second ultrasonic sensor object detection waveform 708, PIR gesture detection waveform 710, speaker output 712, and audible alarm output 714. Alarm event 702 can indicate whether the hazard detection system senses a condition that triggers an alarm event. For example, if the hazard detection system senses smoke, alarm event 702 can transition from low to high (as it does at time $t_1$). PIR sample rate 704 indicates the rate at which PIR data is sampled. Ultrasonic sensor enable 705 indicates whether the ultrasonic sensors are enabled. For example, the ultrasonic sensors can be power gated off when not in use. Ultrasonic sensor object detection waveforms 706 and 708 can indicate whether an ultrasonic sensor detects an object. Waveform 706 can correspond to objects detected in detection field 540, and waveform 708 can correspond to objects detected in detection field 530. PIR gesture detection waveform indicates whether a gesture is recognized within detection field 520. Speaker output 712 indicates whether the speaker is playing back a message, and audible alarm output 714 indicates whether the alarm is sounding.

Figure 6A:
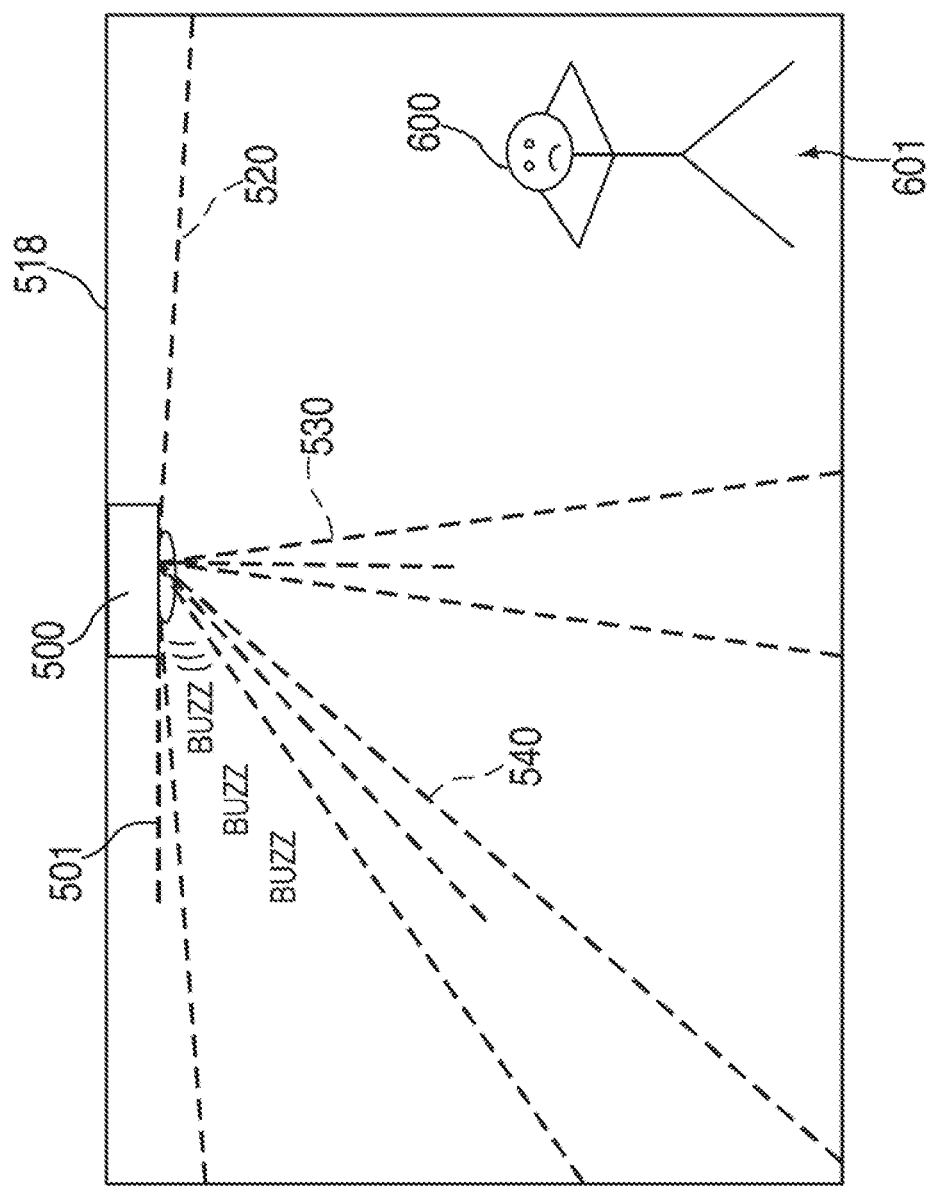

Between times, $t_0$ and $t_1$, the waveforms for alarm event 702, ultrasonic sensor enable 705, first and second ultrasonic sensor detection waveforms 706 and 708, PIR gesture detection waveform 710, speaker output 712, and audible alarm output 714 are all LOW. In this state, the ultrasonic sensors can be power gated off. For example, power gating circuitry 364 can be OPEN so that ultrasonic sensors 320 are OFF. In addition, PIR sample rate 704 is set at a first sample rate. At time, $t_1$, alarm event 702 goes HIGH, which can cause the alarm to sound. Audible alarm output 714 goes HIGH at time, $t_1$. Ultrasonic sensor enable 705 goes HIGH, thereby powering ON the ultrasonic sensors. In addition, PIR sample rate 704 may change from the first sample rate to a second sample rate, where the second sample rate has a higher frequency than the first. In FIG. 6A, hazard detection system 500 is sounding its alarm as indicated by the "buzz, buzz, buzz" emanating therefrom. Person 600 is shown at location 601, which is within detection field 520 but outside of detection fields 530 and 540.

At time, $t_2$, person 600 moves from location 601 to location 602, which is within detection field 520 but outside of detection fields 530 and 540. Because person 600 is moving within detection field 520, the movement may be detected by the PIR sensor. This is shown as the step change in PIR gesture detection waveform 710 at time, $t_2$. Even though the PIR sensor detects a gesture (e.g., movement of person 600) within detection field 520, this does not silence the alarm.

At time, $t_3$, person 600 moves from location 602 to location 603, which is within detection fields 520 and 530 but not within detection field 540. Now that person 600 is within detection field 530, the ultrasonic sensor monitoring that field may sense the presence of person 600. This is shown in ultrasonic sensor object detection waveform 708, which transitions from LOW to HIGH at time, $t_3$. In addition, in response to one of the ultrasonic sensors detecting an object, the speaker may playback a message. As shown in FIG. 6C, the message is "wave to hush alarm." Any suitable message can be played back, in any language. The beginning of the speaker message playback is shown in FIG. 7 as speaker output 712 transitions from LOW to HIGH at time, $t_3$. In addition to, or in place of, the audio message, a visual indicator (e.g., LED 328 of FIG. 3), not shown, may be presented when person 600 is detected as present within detection field 530. The visual indicator may light up or rapidly blink when person 600 is within detection field 530. The audio and/or visual indicator can inform the occupant that the hazard detection system is ready to detect and process any gestures that the occupant may perform. Moreover, the audio and/or visual indicator may provide useful feedback to the occupant so that occupant knows when to perform gesture motions (e.g., because if the occupant performs a gesture outside of detection field 530 or detection field 540, the hazard detection system may ignore the occupant's gesture).

At time, $t_4$, person 600 can wave one or more arms while in position 603. In response to detecting the gesture, the hazard detection system can silence the audible alarm. In FIG. 6D, the "buzz, buzz, buzz" sound is gone. In FIG. 7, PIR gesture detection waveform 710 shows that a gesture is detected at time, $t_4$. The simultaneous detection of the gesture by the PIR sensor and the presence of person 600 within ultrasonic detection field 530 can cause the hazard detection system to silence its alarm. This is shown at time, $t_4$, when audible alarm output 714 transitions from HIGH to LOW. Alarm event 702 is still HIGH at time, $t_4$, thus the alarm may sound again after a predetermined period of time elapses and alarm event 702 is still HIGH. In addition, if desired, a visual indicator may be presented to indicate that the alarm has been hushed. Moreover, if further desired, an audible message may be played back to indicate that the alarm has been hushed. The audible message can specify which alarm is hushed. For example, if the alarm is a smoke alarm, the audible message can specify that the smoke alarm has been hushed. As another example, if the alarm is a self-test, the audible message can specify that the self-test has been hushed. In addition, the audible message can specify for how long the alarm will be hushed. For example, the audible message may say that "The smoke alarm will be silent for five minutes."

FIG. 8 shows an illustrative detection field for PIR sensor 800 in accordance with an embodiment. PIR sensor 800 can cast multiple subfields 810a-i to define detection field 802 and can provide an output in the form of raw data when the object moves from one subfield to another. For example, if an object moves from subfield 810e to subfield 810f, sensor 800 will detect the movement of the object provide it as part of its raw data output. The raw data outputted by sensor 800 may not correspond to an actual physical measurement (e.g., Joules), but may correspond to a combined infrared delta seen by subfields 810a-i within a given time window. Detected movement of an object from one subfield to another subfield contributes to an infrared delta. Thus, if there are several objects passing from one field to another, each of these detected movements can contribute to the combined infrared delta. If, however, an object does not move and stays perfectly still within one subfield, sensor 800 may not detect movement of the object, and the infrared delta can effectively be zero. In some embodiments, the raw data output may be filtered to eliminate ambient infrared noise. For example, the raw data output of PIR sensor 800 may be filtered by a low-pass Butterworth filter with a cutoff frequency at 3 Hz. Illustrative examples of filtered PIR outputs are shown in FIGS. 9A-9D.

Referring now to FIGS. 9A-9D, several different illustrative graphs showing PIR sensor data are shown. In order for a gesture detection algorithm according to various embodiments to ascertain whether a gesture event is being detected, the continuous raw data received from the PIR sensor or the filtered PIR data may be processed by a segmentation algorithm. The segmentation algorithm ascertains amplitude and period statistics of detected motion, and it may be these statistics that are used by a gesture detection algorithm to determine whether a gesture event motion has been detected. Each graph shows magnitude of the combined infrared delta versus time. The magnitude can be a function of how much mass is detected moving from one subfield to another, and the frequency of detected motion can be a function of how fast the object is moving. FIG. 9A illustrates a graph in which no movement is being detected by a PIR sensor. As shown, waveform 910 is flat. FIG. 9B illustrates waveform 920, which can represent one mass unit (e.g., one arm) moving at a "normal" speed. As shown, waveform 920 has period T, and amplitude A. FIG. 9C illustrates waveform 930, which can represent one mass unit moving at a "slow" speed. As shown, waveform 930 has period ½ T and amplitude A. FIG. 9D illustrates waveform 940, which can represent two mass units (e.g., two arms) moving at "normal" speed. As shown, waveform 940 has an amplitude of 2A (e.g., which is twice that of the amplitude generated by a single mass unit) and a period of T.

Figure 10:
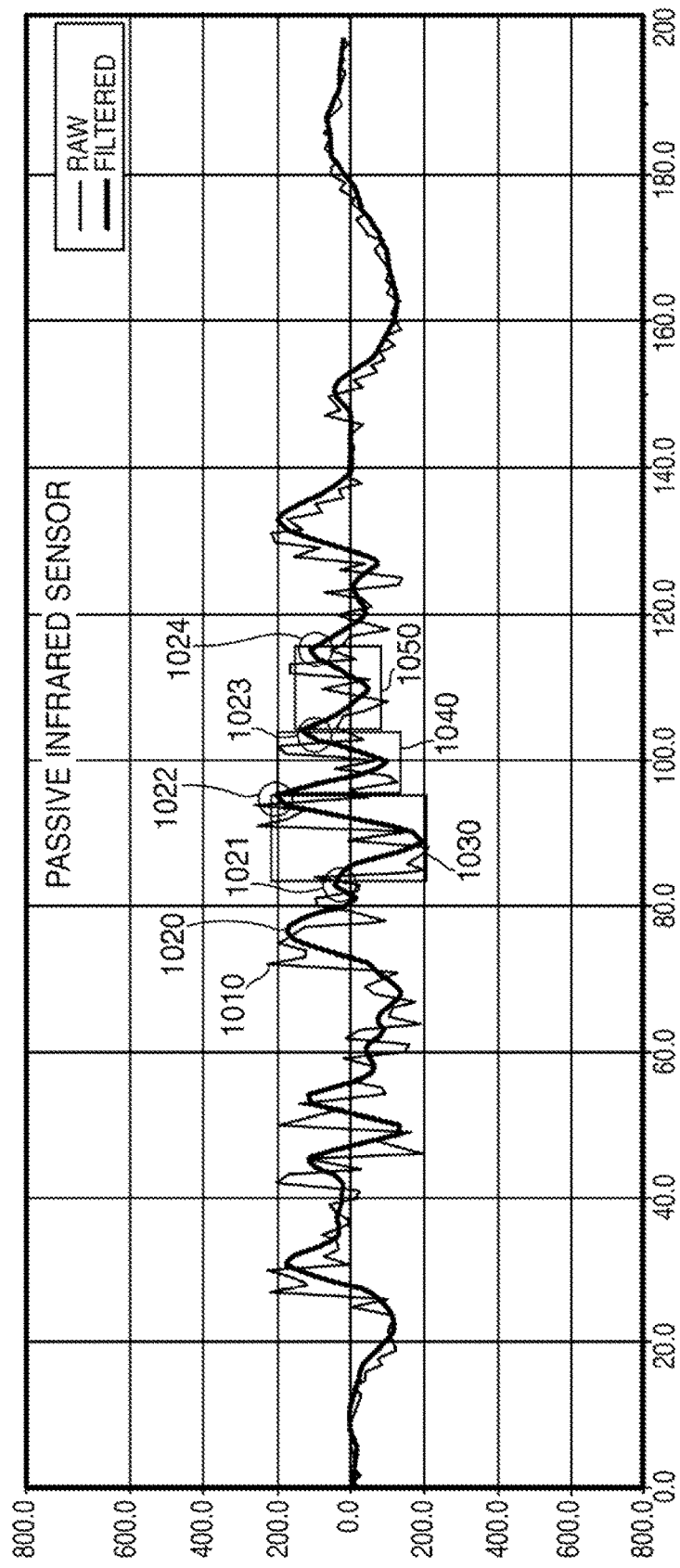
FIG. 10 shows illustrative waveforms of raw and filtered PIR data, according to some embodiments.

FIG. 10 shows illustrative waveforms of raw and filtered PIR data in accordance with an embodiment. The x-axis shows a sample number and the y-axis shows energy delta measured by the PIR sensor. Waveform 1010 may be a raw PIR data waveform and waveform 1020 may be a filtered PIR data waveform. Waveform 1020 can include inflection points 1021, 1022, 1023, and 1024. An inflection point can occur when the slope of a waveform changes from positive to negative or from negative to positive. The inflection points shown in FIG. 10 exist when the slope of waveform 1020 changes from positive to negative. As will be discussed in more detail below, the inflection points can define the boundaries of detected motion events (e.g., a detected wave motion). As shown, waveform 1020 includes detection motion event 1030, which is bounded by inflection points 1021 and 1022, detected motion event 1040, which is bounded by inflection points 1022 and 1023, and detected motion event 1050, which is bounded by inflection points 1023 and 1024. The period and amplitude statistics of each detected motion event can be determined by applying a segmentation process. The pseudo-code for such a process can be represented by:

1. Obtain last three filtered PIR sensor data values;
2. Determine whether an inflection point exist in the filtered data values;
3. If an inflection point exists, then
   a. if a prior inflection point has been observed, then
      i. Let $t_{period} = t_{current} - t_{begin}$
      ii. Let $y_{amplitude} = y_{max} - y_{min}$
   b. Reset $y_{min}$ and $y_{max}$ to a current filtered PIR sensor value
   c. Set $t_{begin}$ to $t_{current}$
4. If the current filtered PIR sensor value is less than $y_{min}$, then set $y_{min}$ to the current filtered PIR sensor value
5. If the current filtered PIR sensor value is more than $y_{max}$, then set $y_{max}$ to the current filtered PIR sensor value where $t_{period}$ is the period of the detected motion event, $t_{current}$ is the time corresponding to the inflection point detected in the last three filtered PIR sensor data values, and $t_{begin}$ is the time corresponding to the prior inflection point. $Y_{amplitude}$ is the amplitude of the detected motion event, $y_{min}$ is the minimum amplitude value observed within the detected motion event and $y_{max}$ is the maximum amplitude value observed within the detected motion event.

Figure 11:
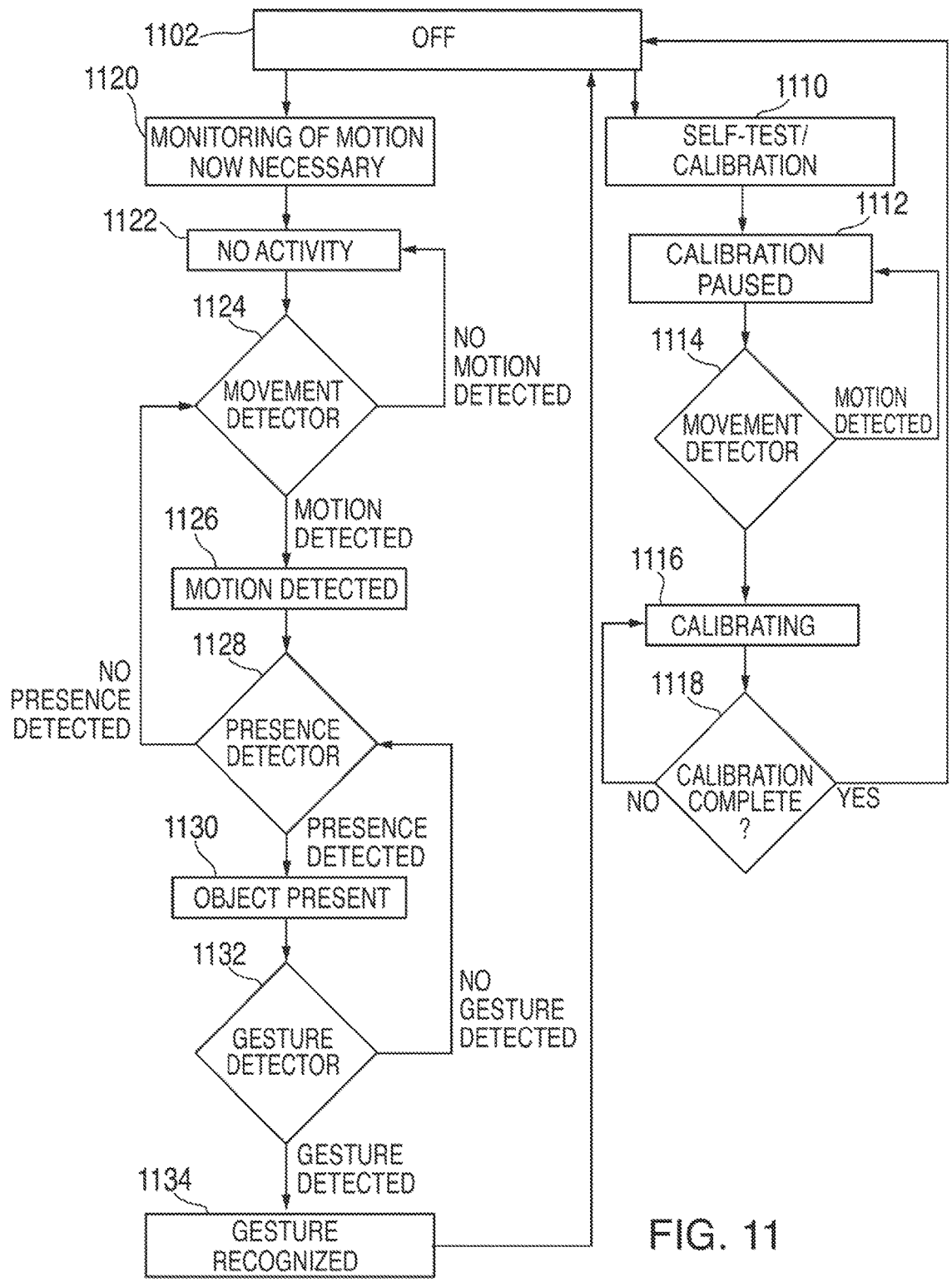
FIG. 11 shows an illustrative process in which a hazard detection system silences an audible alarm in response to monitoring a gesture, according to some embodiments.

FIG. 11 shows an illustrative state machine 1100 for calibrating detection sensors and for detecting a motion event according to an embodiment of the invention. For ease of discussion, the right hand side of the FIG. generally refers to the calibration aspect of state machine 1100 and the left hand side generally refers to the motion detection aspect of state machine 1100. During discussion state machine 1100, reference will be made to FIGS. 12 and 13 to aid in the description of various embodiments. State machine 1100 can be implemented in any suitable system such as a personal computing device, a security system, or a hazard detection system. The system operates according to its design criteria and from time to time, may cause state machine 1100 to change states. When the system does not require any action of state machine 1100, state machine 1100 is in OFF state 1102, which can represent a state in which the sensors are not being used to detect a motion event and are not being calibrated. In some embodiments, state machine 1100 is preferably in OFF state 1102 the majority of its operational life to minimize power consumption.

In order for gestures to be recognized, the system may require a calibration. The calibration can define a baseline from which various detectors can accurately interpret data being received from one or more sensors. In one embodiment, in order to determine presence of an object and the distance of that object from the system, a presence detector may need to be calibrated. A presence detector can use one or more ultrasonic sensors to determine whether an object (such as a user) is present within a predetermined vicinity (e.g., detection field 530 of FIG. 5A) of the system. During calibration, the presence detector can create a "static" environment model of that predetermined vicinity by determining what objects exist in that space. Thus, the static environmental model represents what the presence detector "sees" when no object is attempting a gesture. This can enable the presence detector to compare "real-time" sensor data to the static model in order to determine whether a "new" object is present. In addition, the static model can further enable the presence detector to detect "new" objects even if they are not moving within the predetermined vicinity.

Starting with the right hand side of the FIG., when the system begins a self-test or sensor calibration process (at step 1110), state machine 1100 can transition to calibration paused state 1112. State 1112 can represent a condition in which calibration has not yet begun or in which calibration has been postponed because there has been recent movement as detected by movement detector 1114. Movement detector 1114 can use a PIR sensor, for example, and is discussed in more detail below. If movement detector 1114 detects movement, the state machine can revert to calibration paused state 1112. If no movement is detected, the state machine can proceed to calibrating state 1116. In state 1116, one or more ultrasonic sensors can generate the static environmental model. When calibration is complete (at step 1118), the state machine can proceed to OFF state 1102.

An embodiment for creating a static environment model is now discussed. An alternative embodiment for creating a static environment model is also discussed below in connection with FIG. 18. The model can be defined by a matrix of distances detected in the detection field of each ultrasonic sensor (e.g., ultrasonic sensors 320 of FIG. 3). The matrix discretizes the detected distances into separate buckets that are populated with counts, and it is the counts of these buckets that define the static environment model. The matrix can be an n×m matrix defined by $R_{ij}^s$, where S is a particular ultrasonic sensor, i is the index of a distance bucket ($db_i$), and j is the index of the sample. A total of m samples may be taken, where m is an integer. For example, in one embodiment, m can be 100. A sampling size of one hundred can be achieved by calibrating each ultrasonic sensor for 10 seconds at a 10 hertz sampling rate. As discussed above, multiple ultrasonic sensors can exist in the system. Referring to system 400, for example, ultrasonic sensor, S, can be sensor 420 or 422. Each distance bucket ($db_i$) represents a particular distance that can be detected by the ultrasonic sensor. The distance buckets can range in distance from a minimum distance to a maximum distance, and each bucket can be separated by a predetermined resolution. For example, in one embodiment, the minimum distance can be about 660 mm and the maximum distance bucket can be about 3333 mm, and the resolution can be about 60 mm. Thus, according to this exemplary embodiment, the first distance bucket ($db_1$) can exist at 660 mm, the second ($db_2$) can exist at 720 mm, the third ($db_3$) can exist at 780 mm, and so on such that the last distance bucket exists at 3333 mm.

$R_{ij}^s$ is the number of distances that are within a predefined proximity of distance bucket ($db_i$) observed on iteration j by ultrasonic sensor, S. In one embodiment, an observed distance (d) can exist within a particular distance bucket if ($db_i$)−30<d<($db_i$)+30. The +/−30 values can define the boundaries of the predefined proximity for each distance bucket. For example, assume i is 5 and j is 12 and $db_5$ is 1000 mm, and further assume that ultrasonic sensor, S, detected distances (d) at 990 mm and 1013 mm at sample iteration 12. As a result, $R_{5,12}^s$ is 2.

Each ultrasonic sensor is calibrated and is assigned its own R model. For example, referencing system 400, an R model is calibrated for ultrasonic sensors 420 and 422. Once the R models are obtained for the ultrasonic sensors, two additional arrays can be defined: $r^s$ and $q^s$. $r^s$ is an array containing the means for each distance bucket. Thus, $r_i^s = \text{sum}_{1,\ldots,m}(R_{ij}^s)/m$. Relatively large values found in this array can represent the presence of an object. $q^s$ is an array containing the variances for each distance bucket. Thus $q_i^s = \text{var}_{j=1,\ldots,m}(R_{ij}^s)$. Relatively large values found in this array can indicate objects are intermittently seen or are difficult to detect. The edge of a desk, a ceiling fan, or a piece of acoustically-absorbent material are examples of objects that may yield a relatively large variance. Knowledge of which distances are noisy can better enable a presence detector to avoid false detection of a "new" object.

Figure 12:
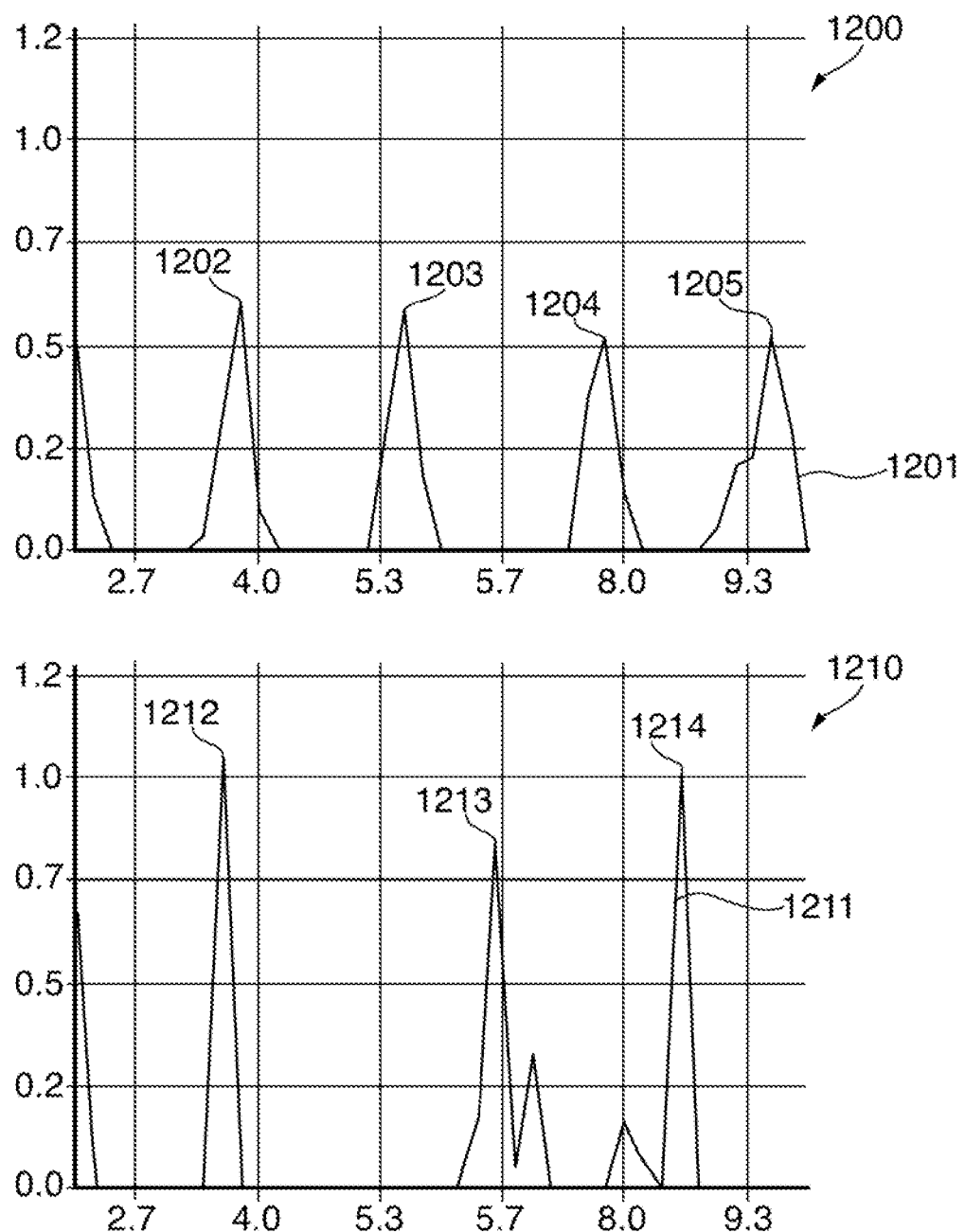
FIG. 12 shows illustrative wave diagrams that may form the calibration basis of two different ultrasonic sensors according to an example scenario.

FIG. 12 shows illustrative diagrams 1200 and 1210 that may form the calibration basis of two different ultrasonic sensors according to an example scenario. In particular, diagram 1200 can include $r^S$ waveform 1201, which may correspond to the mean values associated with a first ultrasonic sensor (e.g., sensor 420). Diagram 1210 can include $r^S$ waveform 1211 may correspond to the mean values associate with a second ultrasonic sensor (e.g., sensor 422). The x-axis shows distance (in feet) and the y-axis represents the mean values. The spikes, which are labeled as 1202-1205 in diagram 1200 and as 1212-1214 in diagram 1210, can represent detected objects. For example, in diagram 1200, objects are detected at distances of approximately 3.9 feet, 5.4 feet, 7.8 feet, and 9.4 feet.

Referring now back to FIG. 11, and with particular reference to the left hand side of the FIG., when the system enters into a state (step 1120) that may elicit motion or some other gesture action by a user, state machine 1100 may transition to NO activity state 1122, as shown. For example, in the context of a hazard detection system, when such a system is in an alarm mode or a pre-alarm mode, the system may expect to monitor a user-based motion to silence the alarm or a pre-alarm message, and thus monitoring of motion may now be necessary. NO activity state 1122 can represent a state in which no movement has been detected and no user is currently present. In addition, when state machine 1100 is in state 1122, the ultrasonic sensors are not used and can be powered off.

If movement detector 1124 (e.g., a detector that uses PIR sensor data) does not detect any movement, state machine 1100 may remain in NO activity state 1122. Movement detector 1124 can leverage the PIR sensor data segmentation process to compare the amplitude (e.g., $y_{amplitude}$) of each detected motion event to a threshold. If the amplitude meets or exceeds the threshold, movement detector 1124 may conclude that some object has moved within the field of view of the PIR sensor. In some embodiments, movement detector 1124 is the same as movement detector 1114. If movement detector 1124 does detect motion, state machine 1100 may transition to motion detected state 1126. Motion detected state 1126 can represent a state in which a radiation sensing sensor such as a PIR sensor or an optical sensor has detected motion of at least one object, but there has not yet been any confirmation that that object is present within a predefined vicinity of the system.

Presence detector 1128 may verify whether an object is present within a vicinity of the system. Presence detector 1128 may construct a "dynamic" model based on real-time ultrasonic sensor data and compare to the static model in order to determine whether a "new" object is present. If no presence is detected, the state machine may revert back to motion detector 1124. If presence is detected, the state machine may proceed to Object present state 1130. Object present state 1130 can represent that an object is present within a predefined vicinity of the system. When the system is in object present state 1130, it may provide an audible message and/or visual cue to inform the occupant that he or she is currently being detected as present and that the system is ready to receive a gesture input from the occupant. Presentation of the audible message and/or visual cue can assist the occupant in positioning him or herself within an appropriate field of view of the hazard detection system so that the system is better able to discern whether the occupant is implementing a gesture.

An embodiment for creating a dynamic environment model is now discussed, however, an alternative embodiment is discussed below in connection with FIGS. 18-21.

The dynamic environment model may embody many of the same elements as that used by the calibration engine to create the static environment model. This model can be defined by a matrix of distances detected in the detection field of each ultrasonic sensor (e.g., ultrasonic sensors 320 of FIG. 3). The matrix discretizes the detected distances into separate buckets that are populated with counts, and it is the counts of these buckets that define the dynamic environment model. The matrix can be an n×m matrix defined by $D_{ij}^s$, where S is a particular ultrasonic sensor, i is the index of a distance bucket ($db_i$), and j is the index of the sample. A total of m samples may be taken, and m is an integer. For example, in one embodiment, m can be 20. A sampling size of twenty can net a two (2) second sampling window at a 10 hertz sampling rate. A D matrix is maintained for each one of the multiple ultrasonic sensors that exist in the system. Each D matrix is updated with new sensor data and old data can be discarded. The distance buckets ($db_i$) used in the D matrices can be the same as the distance buckets used in the R matrices (discussed above).

$D_{ij}^s$ is the number of distances that are within a predefined proximity of distance bucket ($db_i$) observed on iteration j by ultrasonic sensor, S. The predefined proximity can be bounded by the same constraints as the R matrices. In one embodiment, an observed distance (d) can exist within a particular distance bucket if $(db_i)-30<d<(db_i)+30$. The mean of real-time observed distances can be defined by $d_i^s=sum_{j=1,\ldots,m}(D_{ij}^s)/m$. Using $d_i^S$ in combination with calibration arrays $r_i^S$ and $g_i^s$, presence detector 1128 can determine confidence values ($c_i^S$) for each distance bucket. In particular, the confidence values ($c_i^S$) can be defined as $c_i^S=(r_i^s-d_i^S)^2/g_i^S$ for i=1, 2, ..., n. The confidence value can represent confidence that a detected distance has exceeded the expected variance for a particular distance bucket. If $c_i^S$ exceeds a predetermined "new object" variance threshold then presence detector 1128 can conclude that a new object is present at the distance location of distance bucket ($db_i$) of ultrasonic sensor, S. This distance can be referred to herein as the presence distance. The predetermined variance threshold can be tuned to obtained a desired specificity/sensitivity balance for presence detector 1128. For example, increasing the threshold can decrease sensitivity and increase specificity, and decreasing the threshold can increase sensitivity and decrease specificity.

The presence distance of the new object can initially be defined as $u=(u_{max}+u_{min})/2$, where u is the average distance of the new object, $u^{max}$ is the maximum distance of the new object, and $u_{min}$ is the minimum distance of the new object. If desired, a smoothing function may be used to update the value of u in order minimize the potential for noise to disturb the accuracy of the new object's distance. For example, after an initial distance value of the new object is obtained, the following smoothing function can be used: $u=(a)(db_i)+(1-a)u$, where a can be within the range of 0.05 to 0.1.

Figure 13:
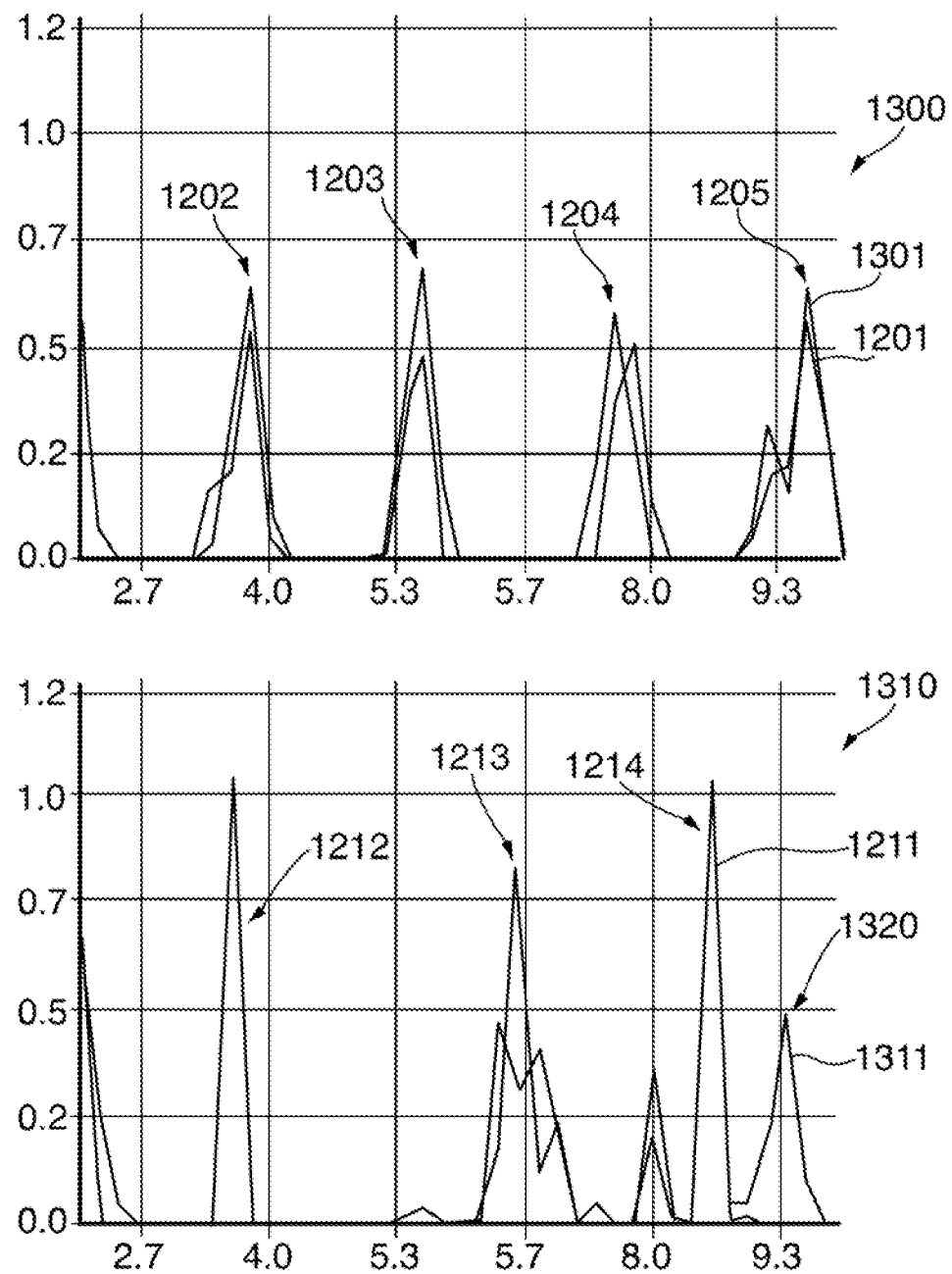
FIG. 13 shows illustrative wave diagrams according to an example scenario.

FIG. 13 shows illustrative waveform diagrams 1300 and 1310 according to an example scenario. Both diagrams 1300 and 1310 include calibration waveforms and real-time data waveforms for two different ultrasonic sensors. In particular, diagram 1300 includes $r^S$ waveform 1201 (the same waveform as shown in FIG. 12) and real-time data waveform 1301 associated with a first ultrasonic sensor. Real-time data waveform 1301 can be the mean of the real-time observed distances, such as $d_i^S$ described above. When comparing waveform 1201 to waveform 1301, there is relatively little variation between the two waveforms. This suggests that the ultrasonic sensor associated with waveforms 1201 and 1301 is not detecting a new object. Diagram 1310 includes $r^S$ waveform 1211 (the same waveform as shown in FIG. 12) and real-time data waveform 1311 associated with a second ultrasonic sensor. A comparison between waveforms 1211 and 1311 indicates that a new object may exist at presence distance 1320, which is shown to have a distance of 9.3 feet.

Referring back to FIG. 11, and state machine 1100 is in object present state 1130, gesture detector 1132 can determine whether a user is performing a gesture. That is, gesture detector 1132 can be utilized when state machine 1100 has progressed from motion detected state 1126 to object present state 1130. Gesture detector 1132 can evaluate data processed by motion detector 1124 and/or presence detector 1128 when making a determination whether the user is performing a gesture. In one embodiment, gesture detector 1132 may apply a set of criteria to a predetermined number of recently received motion detection events. For example, the predetermined number can be the last two, three, or four received motion events. Thus, if the predetermined number is three, then all three motion events must satisfy the criteria in order for gesture detector 1132 to recognize those three motion events as a user generated gesture. The predetermined number of can be selected based on desired sensitivity and specificity parameters of gesture detector 1132. For example, as the predetermined number increases, this can decrease sensitivity and increase specificity. Conversely, as the predetermined number decreases, this can increase sensitivity and decrease specificity.

Some of the criteria may be applied to each motion event individually and some criteria may be applied to the combination of the motion events. The criteria can include a motion event duration time limit. Thus, if the period of a motion event (e.g., $t_{period}$) exceeds the motion event duration time limit, then that motion event may be disqualified as being a gesture. As an alternative to the time limit, the criteria may specify a range of periods that each motion event's period must fall within. The criteria can specify a range of amplitudes within which the motion event's amplitude (e.g., $y_{amplitude}$) must be in order to quality as a gesture event. The range of amplitudes may vary based on the presence distance, u, defined above. The criteria can apply a standard deviation threshold to the amplitudes of each motion event. Thus, in order for the motion events to qualify, the amplitude of each motion event must be within a predetermined number of standard deviations of an average amplitude of the combined motion events. The criteria can also apply variance thresholds to the motion events. Thus, in order for the combined motion events to qualify, the variance of periods must be less than a predetermined variance threshold. In some embodiments, gesture detector 1132 can recognize multiple different gestures.

If gesture detector 1132 does not recognize a gesture, the state machine can revert back to presence detector 1128. If a gesture is recognized, the state machine may proceed to gesture recognized state 1134. Once state machine 1100 reaches state 1134, the system may take appropriate action responsive to the confirmation that a gesture is recognized. For example, in the hazard detection system context, a recognized gesture may result in silencing of a loud sounding alarm or result in ceasing playback of a pre-alarm message. The state machine may proceed to OFF state 1102 after it reaches state 1134, as shown.

Various parameters within presence detector 1128 can be tuned to obtained a desired specificity/sensitivity balance. The distance resolution can be a tunable parameter that can alter the sensitivity and specificity of presence detector 1128 and the calibration thereof. As mentioned above, the distance resolution defines the distance buckets. An increase in resolution can increase specificity and can decrease sensitivity. For example, by increasing the resolution, a new object can be detected at more precise distances and thus may be less likely to be obstructed by objects in the ambient environment, but the new object may be falsely detected due to a relatively low number of samples in each distance bucket. Conversely, a decrease in resolution can decrease specificity and can increase sensitivity. For example, by decreasing the resolution, the sample size can be increased to provide more robust statistics that enhances the confidence factor of whether a new object is present, but objects in the ambient environment may tend to interfere.

The variance threshold for qualifying new objects as being present can be tuned to obtain a desired sensitivity/specificity, balance. As discussed above, the variance threshold is the threshold compared to the confidence value at different distances. The variance threshold can be a tunable parameter that can alter the sensitivity and specificity parameters of presence detector 1128.

Figure 14A:
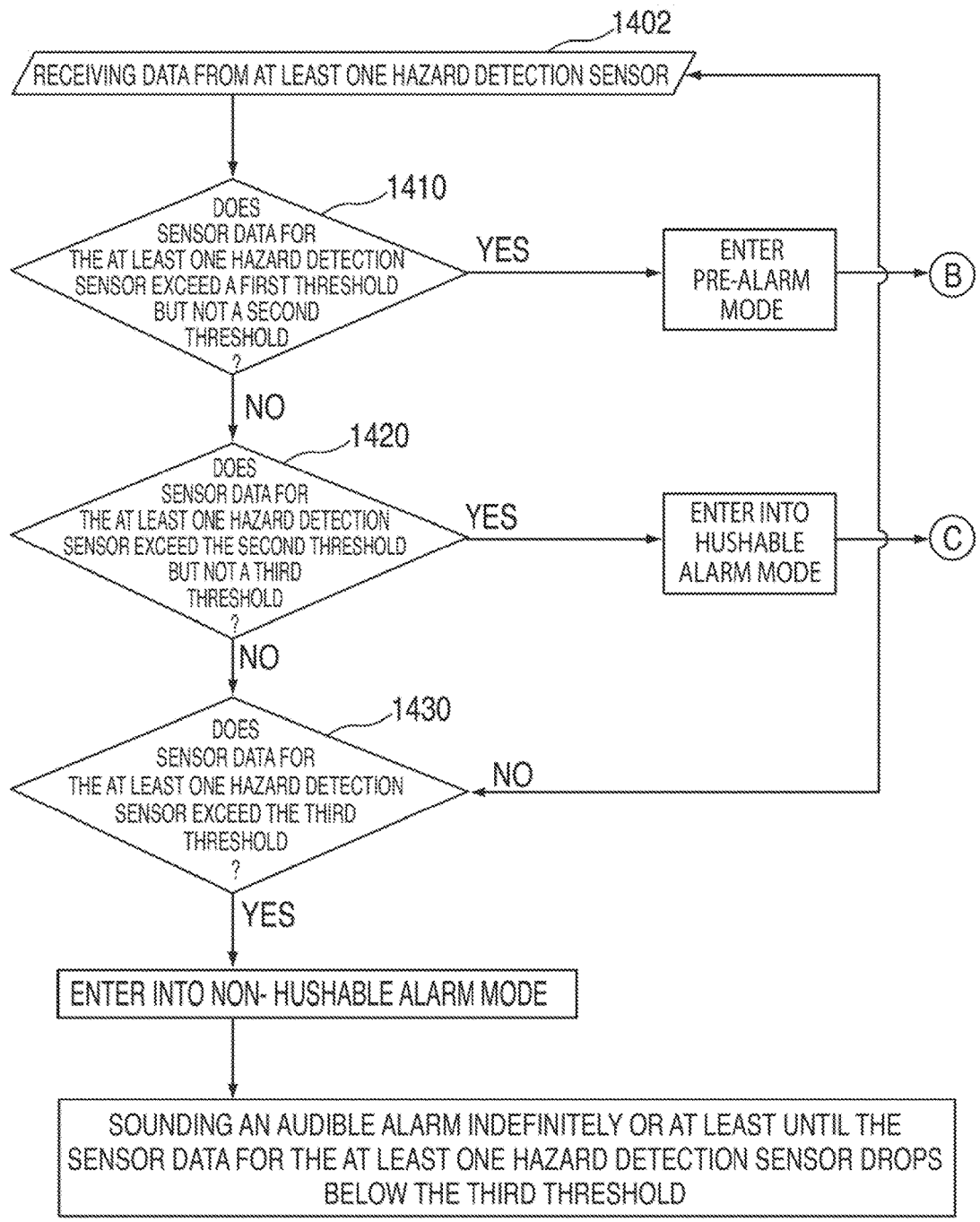
FIGS. 14A-14C show an illustrative process for operating a hazard detection system with gesture hush capability, according to some embodiments.
Figure 14B:
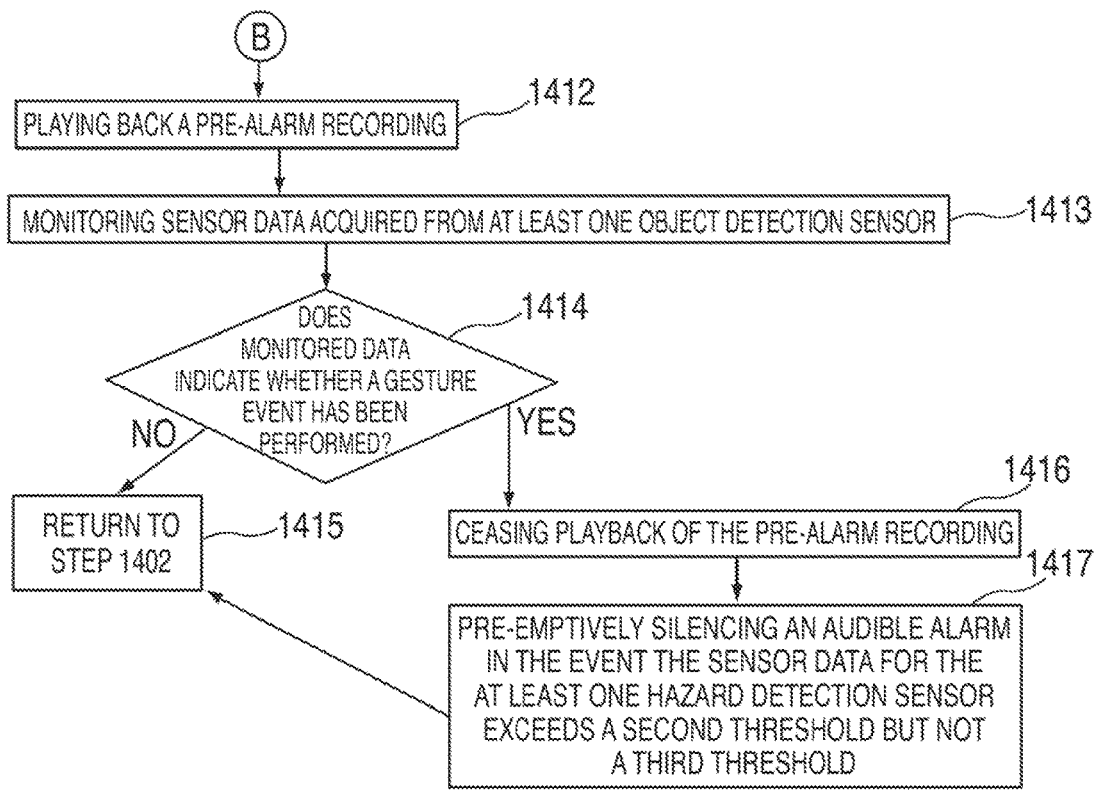
Figure 14C:
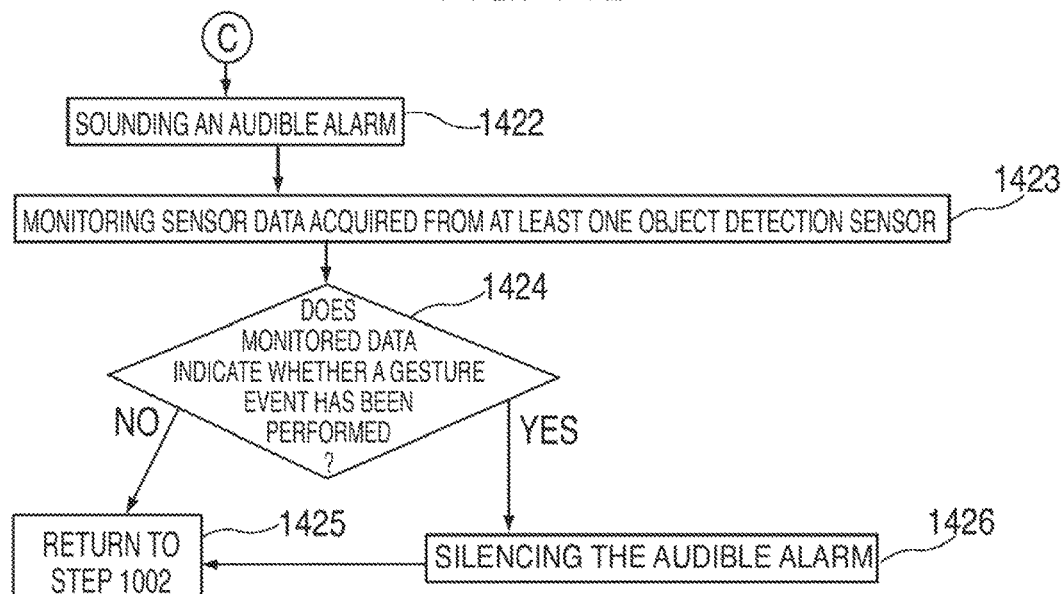

FIGS. 14A-14C show an illustrative process for operating a hazard detection system with gesture hush capability in accordance with an embodiment. This process can be implemented, for example, in a hazard detection system that includes at least one hazard sensor, alarm generation circuitry, PIR sensor, and at least one ultrasonic sensor. For example, the hazard detection system can be system 200, 300, 400, or 500 as discussed above. Starting with step 1002, data is received from at least one hazard detection sensor. For example, the data can be obtained from one or more of sensors (e.g., ALS sensor 322, temperature and humidity sensor 323, smoke detector 324, CO sensor 325, and thermistors 326). The sensor data can be analyzed to determine whether a pre-alarm event or alarm event exists in the vicinity of the hazard system. A Pre-alarm event can be characterized as having similar sensor data as an alarm event, but does not have the same magnitude as that which would cause an alarm event. In other words, pre-alarm event may exhibit data qualities that surpasses a first threshold (which is sufficient to trigger a pre-alarm event) but is less than a second threshold (which is sufficient to trigger an alarm event). An alarm event may exhibit data qualities that equal or surpass the second threshold, and in some embodiments, may even surpass a third threshold, which is higher than the second threshold.

In some embodiments, the alarm event can be categorized as a hushable alarm event or a non-hushable alarm event. A hushable alarm event is one in which an audible alarm can be silenced (e.g., by pressing a button on the hazard system or by performing a gesture hush in a vicinity of the system), and a non-hushable alarm event is one in which an audible alarm cannot be silenced. A hushable alarm event may exhibit data qualities that equal or exceed the second threshold but are less than the third threshold. A non-hushable alarm event may exhibit data qualities that equal or exceed the third threshold. Different categorization of alarm events may be needed to satisfy requirements of different jurisdictions. For example, in the United States, if the data qualities exceed the third threshold, the audible alarm cannot be turned off.

After step 1402, the process proceeds to step 1410. At step 1410, a determination is made whether the sensor data for the at least one hazard detection sensor exceeds a first threshold but not a second threshold. If the determination is NO, the process can proceed to step 1415, which then reverts the process back to step 1402. If the determination is YES, the hazard detection system can enter into a pre-alarm mode, and the process proceeds to step 1412 of FIG. 14B. At step 1412, a pre-alarm recording can be played back. The pre-alarm recording can be any suitable message that can be played through a speaker of the hazard detection system. The pre-alarm recording can be an informative message indicating that an alarm is imminent. The pre-alarm may also instruct a user to perform a gesture event to prevent the hazard system from sounding its audible alarm in the event the sensor data is received that indicates the presence of an alarm event. At step 1413, sensor data acquired from at least one object detection sensor is monitored. The monitored sensor data can include data obtained from a PIR sensor, one or more ultrasonic sensors, or any other radiation detecting sensor or image capturing sensor.

At step 1414, a determination is made as to whether the monitored data indicates a gesture event has been performed. If the determination is NO, the process can proceed to step 1415, which then reverts the process back to step 1402. If the determination is YES, the process proceeds to step 1416. At step 1416, playback of the pre-alarm recording can cease. In some embodiments, another recorded message can be played back in response to a detected gesture event. The other message can inform the user, for example, that the gesture event has been recognized and that the audible alarm will be temporarily disabled. At step 1417, an audible alarm is preemptively silenced in the event the sensor data for the at least one hazard detection sensor exceeds a second threshold but not a third threshold. Thus, if the environmental conditions in and around the hazard detection system exhibit increased levels that would otherwise trigger an alarm event, the monitored gesture event, which was received prior to the elevated levels, prevents an audible alarm from sounding. After step 1417, the process can proceed to step 1415, which returns the process back to step 1402.

Referring back to FIG. 14A, if the determination at step 1410 is NO, the process can proceed to step 1420. At step 1420, a determination is made whether the sensor data for the at least one hazard detection sensor exceeds the second threshold but not a third threshold. If the determination is YES, the hazard detection system can enter into a hushable alarm mode, and the process can proceed to step 1422 of FIG. 10C. At step 1422, an audible alarm is sounded. The audible alarm can, for example, be relatively loud and pulse at regular intervals. At step 1423, sensor data acquired from at least one object detection sensor is monitored. The monitored sensor data can include data obtained from a PIR sensor, one or more ultrasonic sensors, or any other motion detecting sensor.

At step 1424, a determination is made as to whether the monitored data indicates a gesture event has been performed. If the determination is NO, the process can proceed to step 1425, which then reverts the process back to step 1402. If the determination is YES, the process proceeds to step 1426. At step 1426, the audible alarm can be silenced. In some embodiments, the audible alarm can be silenced for a predetermined period of time, regardless of the hazard detection sensor readings. In other embodiments, the audible alarm can be silenced for a predetermined period of time, but can be sounded on demand based on hazard detection sensor readings. After step 1426, the process can proceed to step 1425.

Referring back to FIG. 14A, if the determination at step 1420 is NO, the process can proceed to step 1430. At step 1430, a determination is made whether the sensor data for the at least one hazard detection sensor exceeds the third threshold. If the determination is YES, the hazard detection system can enter into a non-hushable alarm mode, and the process can proceed to step 1432. At step 1432, an audible alarm can be sounded for an indefinite period of time or at least until the sensor data for the at least one hazard detection sensor drops below the third threshold. If the determination is NO at step 1430, the process can proceed back to step 1402.

It is understood that the conditions for steps 1410, 1420, 1430 are merely illustrative and that any suitable conditions can be used to determine whether a pre-alarm event or alarm event exists. For example, various conditions for determining when pre-alarm and alarm events exist can be found be found in commonly assigned U.S. Pat. No. 9,412,258.

Figure 15:
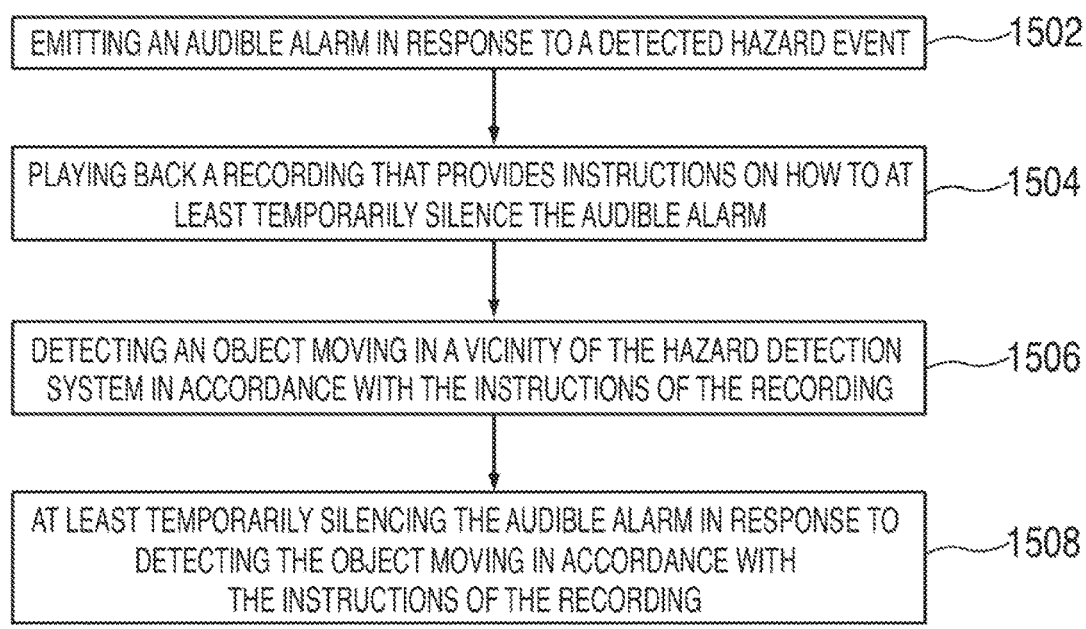
FIG. 15 shows an illustrative process in which a hazard detection system silences an audible alarm in response to monitoring a gesture, according to some embodiments.

FIG. 15 shows an illustrative process in which a hazard detection system silences an audible alarm in response to monitoring a gesture in accordance with an embodiment. Starting with step 1502, an audible alarm is emitted in response to a detected hazard event. For example, the detected hazard event can be the presence of smoke in the vicinity of the hazard detection system. The audible alarm can be emitted by audio generation circuitry, such as alarm 334 of FIG. 3.

Then, at step 1504, a recording can be played back that provides instructions on how to at least temporarily silence the audible alarm. For example, a pre-recorded message can be played through speaker 318 of FIG. 3. In some embodiments, the recording can be played back if the hazard detection system detects motion. For example, if a motion detection sensor, such as a PIR sensor, detects motion within its field of view, this may trigger playback of the recording. As another example, playback of the recording may be triggered if an ultrasonic sensor detects presence of an object within its field of view.

At step 1506, an object is detected moving in a vicinity of the hazard detection system in accordance with the instructions of the recording. In this step, one or more object detecting sensors may detect the object moving within their respective fields of view. Moreover, data acquired from these sensors can indicate that a gesture event was detected. The gesture event may be any suitable movement or combination of movements. In one example, the gesture event can be a waving motion of one or two arms.

At step 1508, the audible alarm is at least temporarily silenced in response to detecting the object moving in accordance with the instructions of the recording. In this step, the audible alarm is turned OFF in response to an affirmative command by a user. The audible alarm may remain OFF for a predetermined period of time before being reactivated, at which time the user may have to commence another gesture event to silence it.

Figure 16:
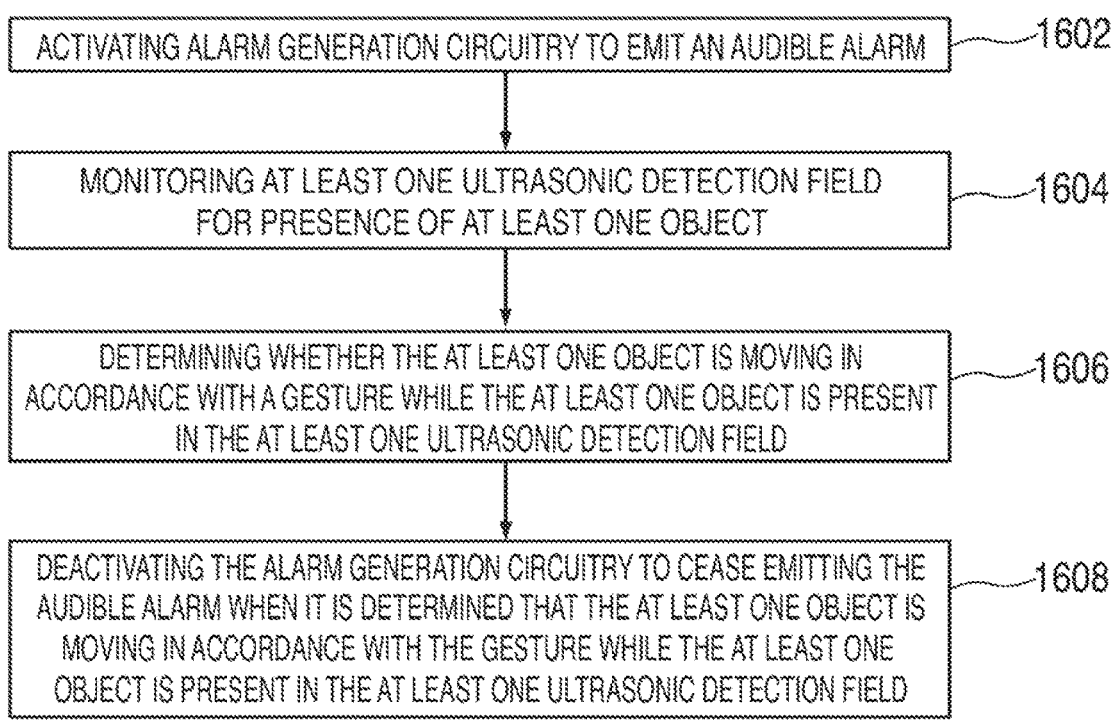
FIG. 16 shows an illustrative process for operating a hazard detection system equipped with at least one ultrasonic sensor, according to some embodiments.

FIG. 16 show an illustrative process for operating a hazard detection system equipped with at least one ultrasonic sensor in accordance with an embodiment. Starting at step 1602, alarm generation circuitry can be activated to emit an audible alarm. The audible alarm can be activated, for example, in response to data received by one or more hazard detection sensors. Next, at step 1604, at least one ultrasonic detection field can be monitored for presence of at least one object. For example, the ultrasonic detection field can be detection field 530 of FIG. 5A or FIG. 6D. At step 1606, a determination is made whether the at least one object is moving in accordance with a gesture while the at least one object is present in the at least one ultrasonic detection field. For example, the moving arms of person 600 in FIG. 6D can be an object moving in accordance with a gesture while within ultrasonic detection field 530.

At step 1608, the alarm generation circuitry is deactivated to cease emitting the audible alarm when it is determined that the at least one object is moving in accordance with the gesture while the at least one object is present in the at least one ultrasonic detection field. The moving object and the object present within an ultrasonic field can be the same or different. For example, referring briefly to FIG. 6D, the body of person 600 may be present and stationary within detection field 530, but the arms can be moving in and out of detection field 530. The presence of the body can be sufficient to satisfy the presence requirement within an ultrasonic field, and the movement of the arms can be sufficient to satisfy the gesture movement.

Figure 17:
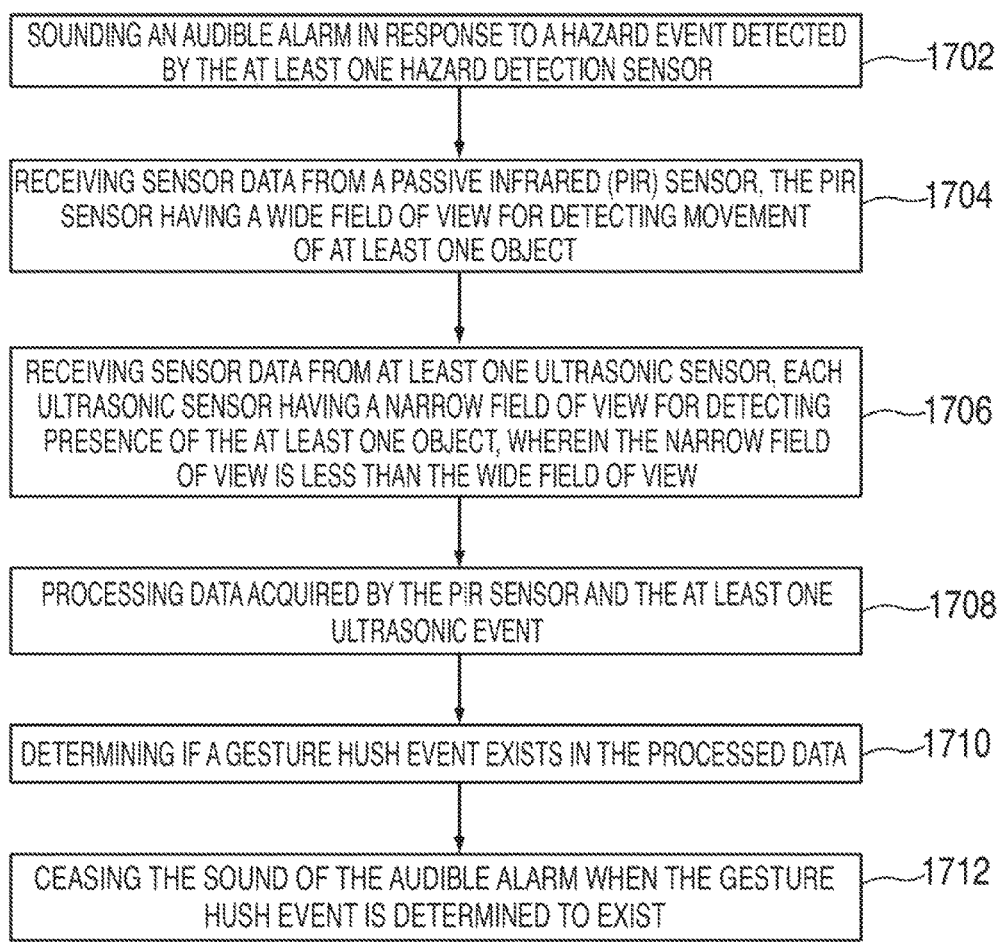
FIG. 17 shows an illustrative process for operating a hazard detection system equipped with a PIR sensor and at least one ultrasonic sensor, according to some embodiments.

FIG. 17 show an illustrative process for operating a hazard detection system equipped with a PIR sensor and at least one ultrasonic sensor in accordance with an embodiment. Beginning with step 1702, an audible alarm can be emitted in response to a hazard event detected by the at least one hazard detection sensor. At step, 1704, sensor data can be received from a passive infrared (PIR) sensor. The PIR sensor has a relatively wide field of view for detecting movement of at least one object. At step 1706, sensor data is received from at least one ultrasonic sensor, each ultrasonic sensor having a relatively narrow field of view for detecting presence of the at least one object. The narrow field of view is less than the wide field of view.

Then, at step 1708, data acquired by the PIR sensor and the at least one ultrasonic sensor can be processed. The data can be processed, for example, by control circuitry (e.g., system processor 310). At step 1710, a determination is made whether a gesture hush event exists in the processed data. For example, the control circuitry can analyze the amplitude and period of waveforms in the processed data. Examples of these waveforms are discussed above in connection with FIGS. 9A-9D. Then, at step 1712, the audible alarm ceases to sound when the gesture hush event is determined to exist.

Alternative embodiments for calibrating the ultrasonic sensors, detecting presence of new objects using the ultrasonic sensors, and detecting a gesture are now discussed, with occasional reference to the state machine of FIG. 11. Calibration of the ultrasonic sensors is now discussed. In particular, the calibration process, which is shown on the right hand side of FIG. 11, can be implemented by generating a histogram of all distances sensed by each ultrasonic sensor. When generating the histogram, a count is added to each distance bucket sensed by the ultrasonic sensor. A distance bucket can exist between a pre-defined range of distances, separated by a fixed interval. For example, the range can be between one foot and ten feet, with buckets separated by 0.2 feet. Thus, a first distance bucket can exist between 1 foot and 1.2 feet, the next can exist between 1.2 feet and 1.4 feet, and the next can exist between 1.4 feet and 1.6 feet, and so on until the last bucket reaches 10 feet. In addition, for each detected distance, a count is added to both adjacent distance buckets. For example, if an object is detected within distance bucket X, a count is added to distance bucket X, and a count is added to distance buckets X−1 and X+1. Adding counts to adjacent distance buckets can account for variances in ultrasonic sensor's ability to detect objects at different distances.

Figure 18:
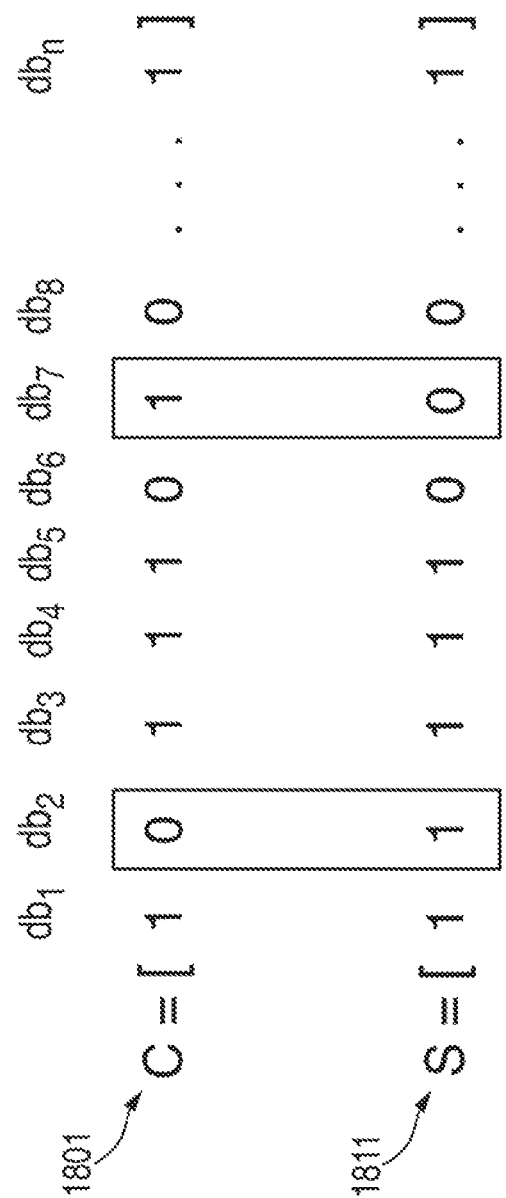
FIG. 18 shows an exemplary calibration matrix, according to some embodiments.

After the histogram of distance buckets for each ultrasonic sensor is obtained, a filter can be applied to it to generate a binary matrix for each sensor. The binary matrix represents whether an object exists at each distance bucket for the entire range of distances. An object may be considered to exist at a particular distance bucket if the number of counts in that bucket meet or exceed a threshold set by the filter. Thus, if the number of counts for a given bucket meets or exceeds the threshold, a binary "1" may be stored in the binary matrix corresponding to that distance bucket. If the number of counts for a given bucket does not meet or exceed the threshold, that bucket is stored as a binary "0." This filter threshold can help eliminate any noise that may be present in the histogram. In some embodiments, the filter can ensure that the binary 1s assigned to various distance buckets in the matrix are indicative of a higher likelihood than not, that an object is present at those distances. An exemplary calibration matrix 1801 is shown in FIG. 18, where C represents a binary calibration matrix for one of the ultrasonic sensors. As shown, matrix 1801 has n different distance buckets, as indicated by $db_1$, $db_2$, $db_3$ and so on until $db_n$. Each position in matrix 1801 corresponds to a different distance bucket. A "1" indicates an object is present at that distance bucket, and a "0" indicates no object is present at that distance bucket. A calibration matrix can be obtained for each ultrasonic sensor at regular intervals (e.g., once a day).

During non-calibration usage of the ultrasonic sensor, such as during execution of the lefthand side of the flowchart of FIG. 11, and particularly for presence detection step 1128, a real-time binary sensor matrix can be generated for each ultrasonic sensor. The same criteria used for generating the calibration matrix may be used for generating a sensor matrix. An exemplary real-time sensor matrix 1811 is shown in FIG. 18, where S represents a real-time binary sensor matrix for one of the ultrasonic sensors. As shown, matrix 1811 includes the same number of distance buckets as matrix 1801 and each position in matrix 1811 is populated with either a "1" or "0" depending on whether an object is detected as present.

A comparison between matrix 1801 and matrix 1811 indicates whether any new objects have been added or any old objects have been lost. An object is added if the real-time sensor matrix indicates the presence of an object at a particular distance bucket that did not exist in the calibration matrix. For example, in comparing db2 of both matrices, a new object is added because a "1" now exists in matrix 1811, whereas in calibration matrix 1801, no object previously existed at that distance bucket. An object is lost if it exists as a present object in the calibration matrix, but is no longer detected as present in the real-time sensor matrix. Comparing db7 of both matrices, an old object is lost because matrix 1801 previously detected the presence of an object, but according to matrix 1811, that object is no longer present. For example, whereas during calibration the sensor may have detected a wall at db7, but during usage, the presence of a user may prevent the sensor from seeing that wall.

The result of the comparison between matrices 1801 and 1811 can indicate whether an object is present. Any suitable formula or criteria can be used to determine whether an object is present within an ultrasonic sensor's field of view. For example, in one embodiment, an object can be considered present if the number of newly added objects is equal to or greater than a first predetermined number (e.g., two), or if the number of newly added objects is equal to or greater than a second predetermined number (e.g., one) and the number of lost objects is equal to or greater than a third predetermined number (e.g., one). Referring briefly to FIG. 11, if the comparison between matrices 1801 and 1811 indicates that an object is present at step 1128, then the state machine of FIG. 11 can transition to object present state 1130.

In some embodiments, different criteria can be used for one or more of the ultrasonic sensors. For example, if the hazard detection device is mounted on the ceiling, a first set of criteria may be used. However, if the hazard detection device is mounted to a wall, a second set of criteria may be used. A ceiling mounted device may require less stringent criteria than a wall mounted device. These different criteria can be used in different stages of the state machine of FIG. 11. In some embodiments, the device can determine how it is mounted based on accelerometer data, if it is equipped with an accelerometer. If there no accelerometer or other device that indicates device orientation, the device can infer how it is mounted based on data obtained from its ultrasonic sensors. For example, if the angled ultrasonic sensor (e.g., sensor 423) is detecting a relatively large percentage of present objects (e.g., more than 60%, more than 70%, or more than 80%), then it can be inferred that the device is mounted to the wall. If both the straight and angled sensors (e.g., sensors 421 and 423) are detecting objects in approximate equal percentages, then it can be inferred that the device is mounted to the ceiling.

After an object is detected as present, gesture detector 1132 may need to know which ultrasonic sensor is detecting the presence of the object. This determination can be made dynamically by calculating which sensor has the largest number of distance changes. The number of distance changes can be calculated by adding the number of newly added objects to the number of objects lost. For example, referring to matrices 1801 and 1811 of FIG. 18, the number of distance changes for that particular ultrasonic sensor is 2, since there is one added object and one lost object. If for example, the number of distance changes for the other ultrasonic sensor (not shown) is one, then the ultrasonic sensor associated with matrices 1801 and 1811 may be deemed as the actual sensor sensing presence of the object. When a sensor is chosen as the "correct" sensor, the state machine may stick with this sensor for determining whether a gesture is detected at step 1132 until it no longer sees the object.

Moreover, as part of gesture detection at step 1132, the state machine may use a distance settling algorithm to reduce potential for false positives. The distance settling algorithm may be able to determine periods of time when an occupant is detected within a field of view of an ultrasonic sensor, and is not moving closer to or away from the hazard detection device. For example, the distance settling algorithm can discern when an occupant enters a room containing the hazard detection system, when the user stops moving towards or away from the hazard detection system, and when the user exits the room. In order to minimize or prevent false positives, it may be desirable to ignore PIR gesture motions unless the occupant is relatively still. Thus, if the occupant is moving (e.g., walking into or out of the room), then any PIR gesture motions may be ignored. However, if the user is relatively still and is moving his or her arms and hands to implement a gesture motion, this motion may be processed as a potential gesture motion.

Figure 19A:
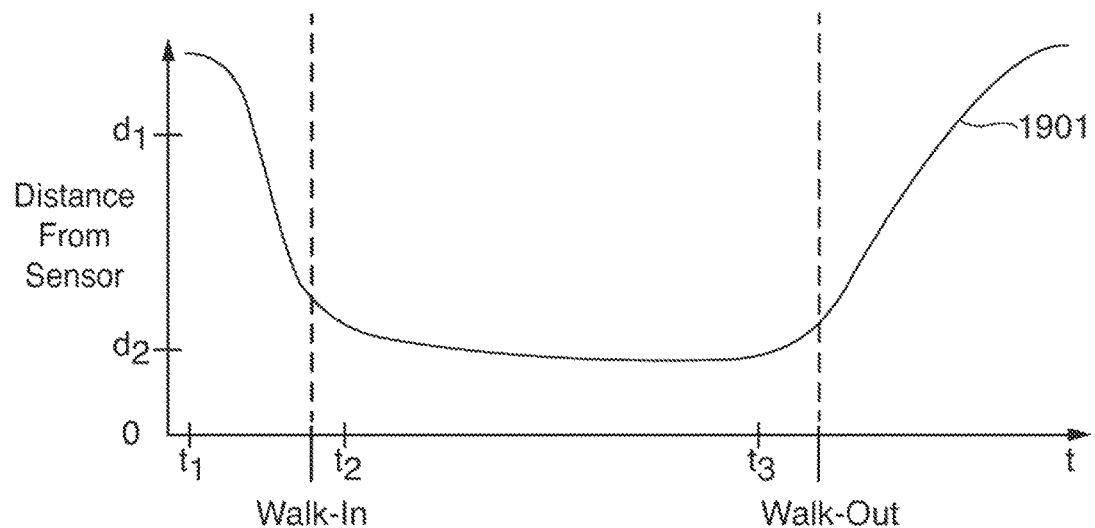
FIG. 19A shows an illustrative waveform that can represent distances detected by one of the ultrasonic sensors over time, according to some embodiments.

Referring now to FIG. 19A, an illustrative waveform 1901 is shown. Waveform 1901 can represent distances detected by one of the ultrasonic sensors over time. In one embodiment, waveform 1901 may be based on data obtained from the ultrasonic sensor determined to be detecting presence of the object. Waveform 1901 can be generated by ascertaining the closest distance added during each sample period. As shown, at time, t1, a new distance is added at a relatively far distance away from the sensor (shown as d1), but as time progresses, the new distances added appear as decreasing distances to the sensor, until it the distances settle out around d2. An occupant may have walked into a room between times t1 and t2 and stopped moving towards or away from the sensor between times t2 and t3. The user, however, may be moving his or her arms or hands between times t2 and t3. After time t3, the occupant may have walked out of the room because the new added distances increase in distance away from the sensor.

Figure 19B:
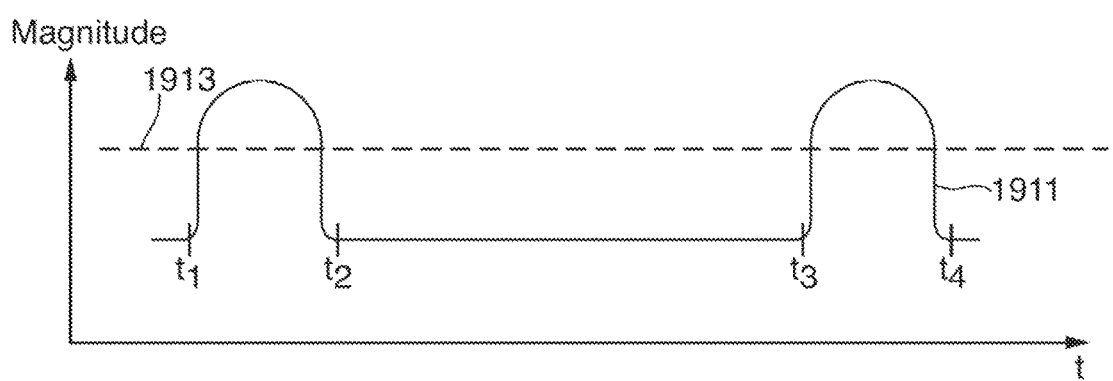
FIG. 19B shows a derivative waveform of the waveform of FIG. 19A, according to some embodiments.

The distance settling algorithm may generate a derivative waveform 1911, as shown in FIG. 19B, based on the closest distance sampling described above in connection with FIG. 19A. Derivative waveform 1911 may be represented by an absolute value of the differences of waveform 1901. As shown, the peaks of waveform 1911 correspond to the relatively large distance changes between times t1 and t2, and between times t3 and t4. In addition, the flat portion of waveform 1911 corresponds to the relatively unchanging portion of waveform 1901. The distance settling algorithm can impose threshold 1913 on waveform 1911 to determine when the occupant is settled or not. If any portion of waveform 1911 exceeds threshold 1913, then it can be considered that the occupant is not settled and no gesture processing inputs will be processed while waveform 1911 is considered not settled. Thus, as shown, since waveform 1911 exceeds threshold 1913 between times t1 and t2, and again between times t3 and t4, no gesture inputs may be considered within these timeframes. Thus, even if the PIR sensor is detecting a waving motion between either times t1 and t2 or times t3 and t4, these PIR sensor readings may be discarded. However, if the PIR sensor is detecting motion between times t2 and t3, for example, the PIR sensor data obtained during this time period may be used by a gesture detection algorithm.

The gesture detection algorithm (such as the algorithm processed at step 1132 of FIG. 11) can analyze PIR sensor data during settled periods, as determined by the distance settling algorithm, to determine whether a gesture motion (e.g., a wave) exists in the PIR sensor data. The PIR sensor data may be analyzed by first determining the peaks in the PIR sensor data. Peaks can be ascertained using, for example, a slope change detection method or a zero-cross detection method. In the slope change detection method, changes from positive to negative slope can mark a max of a peak, and changes from negative to positive can mark a minimum of a peak. If desired, hysteresis can be built into the slope change detector to ignore sudden and abrupt slope changes. This can be accomplished by applying thresholds to qualify peaks as a max peak or a minimum peak. For example, in order for a peak to be considered a max peak, the waveform must drop a predetermined number below the max peak. If it does, then the peak can be recognized a max peak. This can guard against a situation where a peak is reached, then the waveform drops a miniscule amount and the starts rising again to another peak. But for the threshold, this miniscule peak would be registered as a peak. The same basic principle applies to minimum peaks. When a minimum peak is reached, the waveform must rise at least a predetermined amount Once the max and min peaks are found, the amplitude and period of the gestures can be ascertained. In the zero-cross method an average value of the PIR sensor data is obtained, and compared to the raw PIR sensor data. Zero crosses occur when the average value of PIR sensor data intersects with the raw PIR sensor data. The amplitude and period of the PIR sensor data can be obtained from the zero crosses. In some applications, the slope change detector may more applicable, whereas in other applications, the zero-cross detector may be more applicable. For example, since wave-like gesture motions are fairly consistent—thereby producing a relatively non-noisy signal—the slope change detector may be the more suitable detector for detecting waves. However, when the PIR data is relatively noisy, the zero cross detector may be the more suitable detector for detecting motions in the PIR data.

Figure 20:
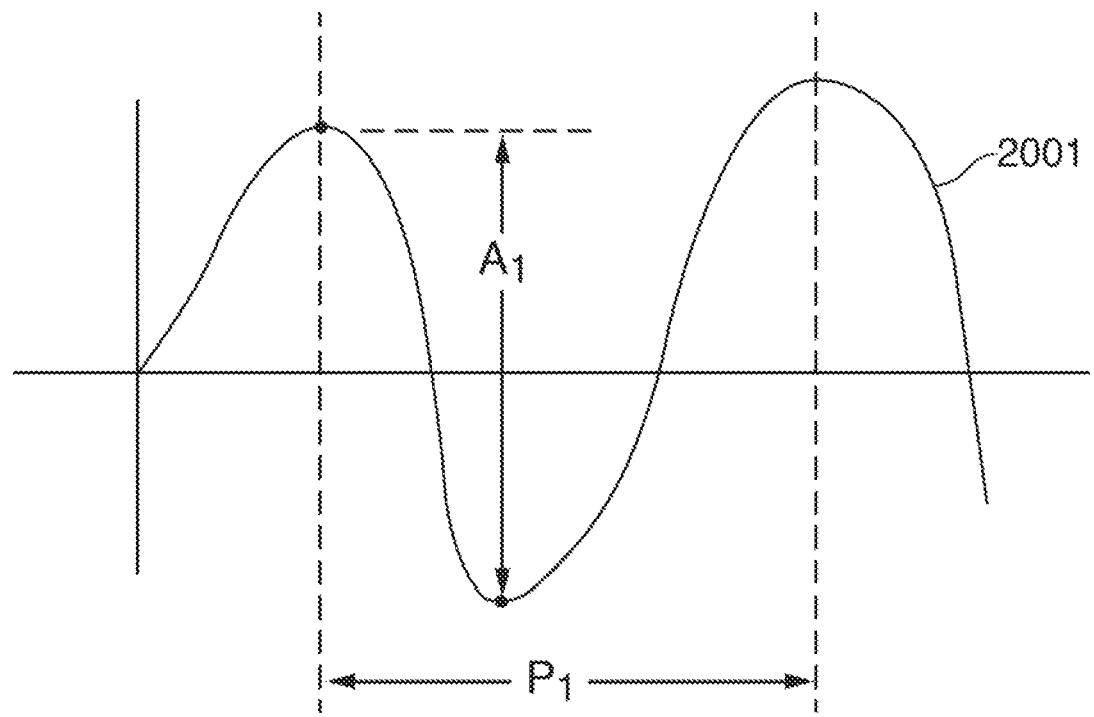
FIG. 20 shows an illustrative gesture waveform, which may represent a wave gesture, according to some embodiments.
Figure 21:
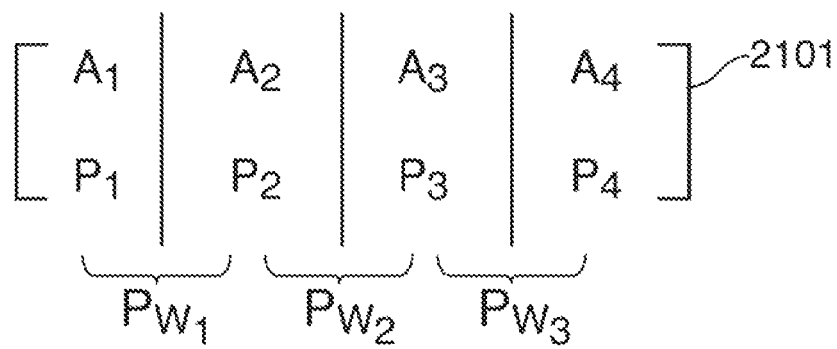
FIG. 21 shows illustrative buffer containing gesture waveforms, according to some embodiments.

Regardless of which detector is used, the amplitude and period of each gesture motion is obtained. For example, FIG. 20 shows an illustrative gesture waveform 2001, which may represent a wave gesture. Waveform 2001 has amplitude A1 and period P1. If the amplitude and period of the waveform meet predefined criteria, then the amplitude and period of that waveform are stored in a rolling buffer of wave gestures. The predefined criteria can define the lower and upper bounds for the amplitude and the lower and upper bounds of the period. FIG. 21 shows illustrative buffer 2101. The rolling buffer of wave gestures can store a fixed number of waves. For example, as shown in buffer 2101, four waves are stored. As each new wave satisfying the predefined criteria is obtained, it is rolled into the buffer. If the buffer is full, the new wave can push out an old wave. This way, the buffer stores the newest waves satisfying the criteria. If no new waves satisfying the predefined criteria are received within a predetermined period of time, the buffer is cleared.

When buffer 2101 has stored therein two or more waves, pair wise combinations of waves are compared to determine whether a comparison between two waves satisfies a set of conditions. As shown in FIG. 21, three different pair wise combinations are shown, Pw1, Pw2, and Pw3. Pw1 can be a comparison between wave 1, which includes A1 and P1, and wave 2, which includes A2 and P2. Pw2 can a comparison between wave 2, which includes A2 and P2, and wave 3, which includes A3 and P3. Pw3 can a comparison between wave 3, which includes A3 and P3, and wave 4, which includes A4 and P4. If desired, a pairwise combination can be made between wave 1 and wave 3, or between wave 2 and wave 4.

For each pair wise comparison, the average amplitude and average period of two waves may be applied to a set of conditions. The conditions can specify upper and lower bounds of the average amplitude and upper and lower bounds of the average period. If the average amplitude and average period of the pair wise combination meet the conditions, the two waves may be considered to be a matched wave pair. In some embodiments, one matched wave pair may be sufficient to qualify as a detected wave gesture. In other embodiments, two or more matched wave pairs may be required in order for the PIR sensor data to quality as a detected wave gesture. It is understood that the pair wise comparison can be made with settled and unsettled PIR data, and that the gesture detection algorithm according to various embodiments can decide how best to use the settled and unsettled factors in evaluating the PIR data.

It is to be understood that the steps shown in the flowcharts of one or more of FIGS. 11, 14A-14C, and 15-17 are merely illustrative and that existing steps may be modified or omitted, additional steps may be added, and the order of certain steps may be altered.

It is understood that although the embodiments described herein with respect to a hazard detection system, these embodiments may also be used in any system or device where it is desired to maintain sensing and monitoring of other events while updating the operational capabilities of one of more components of that system or device. For example, the other events can include events that are not necessarily tied to hazards such as smoke, CO, and heat, but can include motion detection, sound detection, and the like. Events reported by remote devices may also be taken into account. For example, security device such as window and door sensor, and motion detection sensors that provide feedback to a system may quality as other events.

Moreover, the processes described with respect to FIGS. 1-21, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module discussed herein may be provided as a software construct, firmware construct, one or more hardware components, or a combination thereof. For example, any one or more of the modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A hazard detection system, comprising:
    at least one hazard detection sensor;
    alarm generation circuitry operative to sound an audible alarm;
    a speaker for playing back a recorded message;
    gesture detection circuitry operative to detect a gesture event; and
    control circuitry operative to:
        playback a recorded message through the speaker, the recorded message including instructions for a user to perform the gesture event in a vicinity of the hazard detection system;
        process data acquired from the gesture detection circuitry to determine whether the gesture event has been performed; and
        change a state of the hazard detection system in response to a determination that the gesture event has been performed.

2. The hazard detection system of claim 1, wherein the control circuitry is further operative to:
    sound the audible alarm by instructing the alarm generation circuitry in response to the at least one hazard detection sensor detecting a hazard event;
    playback the recorded message during the hazard event; and
    cease sounding the audible alarm to change the state of the hazard detection system in response to a determination that the gesture event has been performed.

3. The hazard detection system of claim 2, wherein the control circuitry is further operative to:
    playback the recorded message when the at least one hazard detection sensor detects a pre-alarm event;
    cease playing back the recorded message to change the state of the hazard detection system in response to a determination that the gesture event has been performed.

4. The hazard detection system of claim 2, wherein the gesture detection circuitry comprises a passive infrared sensor.

5. The hazard detection system of claim 2, wherein the gesture detection circuitry comprises an ultrasonic sensor.

6. The hazard detection system of claim 2, wherein the at least one hazard detection sensor is selected from the group consisting of a smoke sensor, a carbon monoxide sensor, a thermistor, a humidity sensor, and combination thereof.

7. A method for processing a gesture to alter a state of an audible alarm, the method implemented by a hazard detection system, the method comprising:
    activating alarm generation circuitry to emit an audible alarm;
    monitoring at least one ultrasonic detection field for presence of at least one object;
    determining whether the at least one object is moving in accordance with a gesture while the at least one object is present in the at least one ultrasonic detection field; and
    deactivating the alarm generation circuitry to cease emitting the audible alarm when it is determined that the at least one object is moving in accordance with the gesture while the at least one object is present in the at least one ultrasonic detection field.

8. The method of claim 7, further comprising:
    monitoring a space in a vicinity of the hazard detection system for at least one moving object; and
    disregarding any monitored moving object if the monitored moving object is outside of the at least one ultrasonic detection field.

9. The method of claim 7, wherein monitoring at least one ultrasonic detection field comprises using at least one ultrasonic sensor to detect the presence of the at least one object within the at least one detection field.

10. The method of claim 7, wherein the monitoring at least one ultrasonic detection field comprising monitoring first and second ultrasonic detection fields for presence of at least one object.

11. The method of claim 10, wherein the first ultrasonic detection field does not overlap the second ultrasonic detection field.

12. The method of claim 10, wherein the first and second ultrasonic detections fields at least partially overlap each other.

13. A hazard detection system, comprising:
alarm generation circuitry for generating an audible alarm in response to a detected hazard event;
at least one ultrasonic sensor, each ultrasonic sensor having a detection field for monitoring presence of at least one object; and
control circuitry operative to:
instruct the alarm generation circuitry to emit the audible alarm during the detected hazard event; and
receive sensor data from at least one sensor, including the at least one ultrasonic sensor;
process the sensor data to determine whether a hush gesture has been captured by the sensor data; and
instruct the alarm generation circuitry to at least temporarily cease emitting the audible alarm when the hush gesture has been captured by the received sensor data.

14. The hazard detection system of claim 13, wherein hush gesture comprises detection of at least one object, wherein the control circuitry is operative to:
verify that the at least one object is present within the detection field of the at least one ultrasonic sensor when processing the sensor data to determine whether the hush gesture has been captured by the received sensor data.

15. The hazard detection system of claim 13, wherein the at least one ultrasonic sensor can be power gated ON and OFF, wherein the control circuitry is further operative to:
selectively power ON the at least one ultrasonic sensor during the detected hazard event.

16. The hazard detection system of claim 13, wherein the sensor data comprises ultrasonic sensor data and motion sensor data.

17. The hazard detection system of claim 13, wherein the hazard detection system is mountable according to one of a wall mounted orientation and a ceiling mounted orientation.

18. The hazard detection system of claim 17, wherein the at least one ultrasonic sensor comprises a wall mounted ultrasonic sensor and a ceiling mounted ultrasonic sensor.

19. The hazard detection system of claim 18, wherein the control circuitry is operative to use sensor data from the wall mounted ultrasonic sensor when the hazard detection system is in the wall mounted orientation and from the ceiling mounted ultrasonic sensor when the hazard detection system is in the ceiling mounted orientation.

20. A hazard detection system, comprising:
at least one hazard detection sensor operative to monitor an environment in a vicinity of the hazard detection system, wherein the hazard detection system operates according to one of an idle mode, a pre-alarm mode, and an alarm mode;
alarm generation circuitry operative to sound an audible alarm in the alarm mode;
a speaker operative to playback at least one recorded message;
gesture detection circuitry operative to monitor the vicinity for a gesture; and
control circuitry operative to:
select one of the idle, pre-alarm, and alarm modes based on data acquired from the at least one hazard detection sensor; and
wherein, when the hazard detection system is in the pre-alarm mode, the control circuitry is further operative to:
playback a recorded message through the speaker;
detect whether the gesture is monitored by the gesture detection circuitry; and
pre-emptively disable the alarm generation circuitry when the gesture is detected and the data acquired from the at least one hazard detection sensor is sufficient to change the system operation from the pre-alarm mode to the alarm mode.

21. The hazard detection system of claim 20, wherein the gesture detection circuitry comprises:
a passive infrared (PIR) sensor having a wide field of view for detecting movement of at least one object; and
at least one ultrasonic sensor each having a narrow field of view for detecting presence of at least one object, wherein the narrow field of view is less than the wide field of view.

22. The hazard detection system of claim 21, wherein the recorded message played through the speaker during the pre-alarm mode comprises an instructional message.

23. The hazard detection system of claim 22, wherein the control circuitry is further operative to playback a confirmation message in response to a detected gesture.

24. The hazard detection system of claim 20, wherein the alarm mode comprises a hushable alarm mode and non-hushable alarm mode.

25. The hazard detection system of claim 24, wherein the control circuitry is further operative to permit the pre-emptive disablement of the alarm generation circuitry while the system is in the hushable alarm mode.

26. The hazard detection system of claim 24, wherein the control circuitry is further operative to cease the pre-emptive disablement of the alarm generation circuitry while the system is in the non-hushable alarm mode.

* * * * *